United States Patent
Lafortune et al.

(10) Patent No.: US 10,713,339 B2
(45) Date of Patent: Jul. 14, 2020

(54) BUILD SYSTEM WITH PLUGINS FOR ENCRYPTION OF APPLICATION COMPONENTS

(71) Applicant: GUARDSQUARE NV, Leuven (BE)

(72) Inventors: Eric Lafortune, Herent (BE); Johan Leys, Lubbeek (BE); Heidi Rakels, Herent (BE)

(73) Assignee: GUARDSQUARE NV, Leuven (BE)

(*) Notice: Subject to any disclaimer, the term of this patent is extended or adjusted under 35 U.S.C. 154(b) by 226 days.

(21) Appl. No.: 16/066,158

(22) PCT Filed: Dec. 29, 2016

(86) PCT No.: PCT/EP2016/082893
§ 371 (c)(1),
(2) Date: Jun. 26, 2018

(87) PCT Pub. No.: WO2017/114931
PCT Pub. Date: Jul. 6, 2017

(65) Prior Publication Data
US 2018/0373848 A1  Dec. 27, 2018

(30) Foreign Application Priority Data

Dec. 29, 2015 (EP) .................................... 15202885

(51) Int. Cl.
*G06F 21/12* (2013.01)
*G06F 9/445* (2018.01)
*G06F 21/62* (2013.01)

(52) U.S. Cl.
CPC ........ *G06F 21/125* (2013.01); *G06F 9/44526* (2013.01); *G06F 21/629* (2013.01)

(58) Field of Classification Search
CPC ... G06F 21/125; G06F 9/44526; G06F 21/629
(Continued)

(56) References Cited

U.S. PATENT DOCUMENTS 8,205,096 B2 * 6/2012 Cheng ................... G06F 21/126
                                                    713/189
8,725,645 B1 * 5/2014 Montini ................ G06F 21/121
                                                    705/50

(Continued)

FOREIGN PATENT DOCUMENTS

| WO | 9941651 A2 | 8/1999 |
| WO | 2004023313 A1 | 3/2004 |
| WO | 2011057393 A1 | 5/2011 |

OTHER PUBLICATIONS

"DexGuard The Most Advanced Mobile App Security Software for Android," Android Obfuscation and Runtime-Self Protection (RASP), Downloaded on Jun. 4, 2018 from https://www.guardsquare.com/en/dexguard, 5 Pages.

(Continued)

*Primary Examiner* — Kambiz Zand
*Assistant Examiner* — Aubrey H Wyszynski
(74) *Attorney, Agent, or Firm* — Workman Nydegger

(57) ABSTRACT

There is described a build system for generating an enhanced application comprising at least one encrypted application component during a build operation. The build system comprises a build tool and two or more build tool plugins. The build tool plugins each comprise an encryption module and a decryption module.

18 Claims, 10 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2008/0171598 A1* | 7/2008 | Deng ..................... | G07F 17/32 |
| | | | 463/40 |
| 2008/0320463 A1* | 12/2008 | Peterson ................. | G06F 8/60 |
| | | | 717/168 |
| 2011/0191593 A1* | 8/2011 | Cheng ................... | G06F 21/126 |
| | | | 713/189 |
| 2014/0173759 A1* | 6/2014 | Essary ................... | G06F 21/10 |
| | | | 726/30 |

OTHER PUBLICATIONS

"ProGuard The Open Source Optimizer for Java Bytecode," ProGuard Official Website, Downloaded on Jun. 4, 2018 from https://www.guardsquare.com/en/proguard, 5 Pages.

European Search Report from EP Application No. EP15202885.8, dated Jun. 29, 2016.

International Search Report from PCT Application No. PCT/EP2016/082893, dated Mar. 7, 2017.

\* cited by examiner

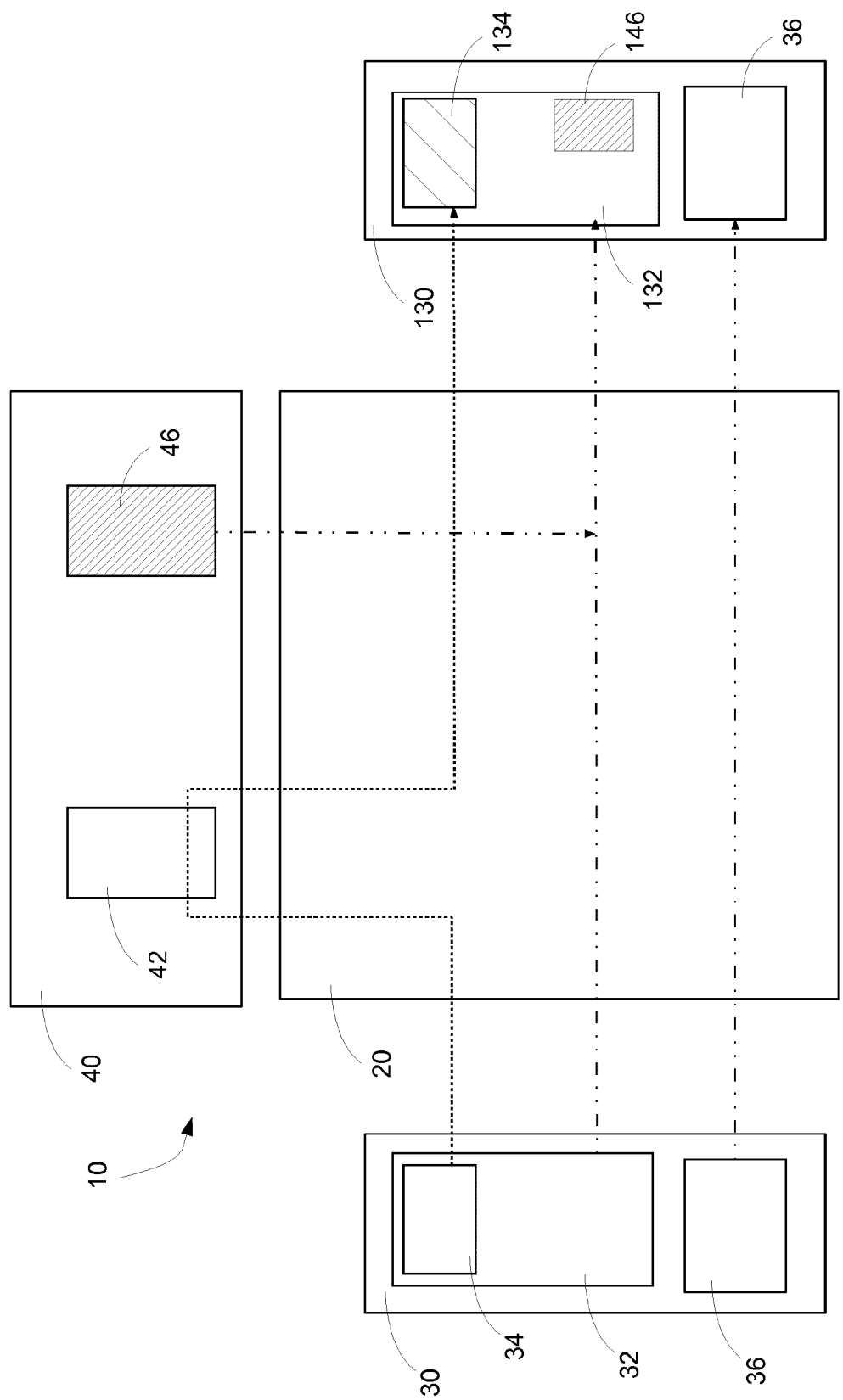

BUILD SYSTEM WITH PLUGINS FOR ENCRYPTION OF APPLICATION COMPONENTS

FIELD OF THE INVENTION

The present invention generally relates to the field of information security. More specifically it relates to systems and methods for protecting resources and assets of software applications from unauthorized access. It is specifically useful in the context of software applications distributed for use in mobile devices.

BACKGROUND OF THE INVENTION

The growth in popularity of mobile applications distributed by means of vendor distribution platforms, such as for example Google Play, Apple App Store, etc., which distribute software applications for use on mobile devices comprising a mobile operating system, such as Android and iOS, is attracting the attention of hackers. These hackers, for example in an effort to distribute unauthorized rebranded variants of the distributed mobile application try to get access to the source code, assets, resources, etc. of the distributed software application. These approaches often involve free tools and often can be performed within for example a few hours or less. This then allows the hacker, for example by means of minor modifications to resources to rebrand the software application for unauthorised redistribution. Such operations could for example include modification of resources such as the application launch icon, application logo or other images, the application name, references to urls, etc.

Java software applications offer an efficient framework for developing and deploying enterprise and server or client-side applications. During a build operation of the development stage of the software application the Java source code is compiled to Java bytecode. In this way for example there is compiled one or more Java class files, which are files, often with a .class filename extension, comprising Java bytecode that can be executed on the Java Virtual Machine or JVM. Such a Java class file is produced by a Java compiler from Java programming language source files, which are files, often a .java extension, comprising the source code programming instructions for Java classes. If a Java source file comprises more than one Java class, each Java class is typically compiled into a separate Java class file comprising its bytecode. After compilation, the build operation continues by packaging these Java class files together with related metadata and application resources, such as for example an image file comprising the application icon, in a software package for distribution. Low-cost, widely available applications are available which for example enable inspection of these software packages, to enable modification of the application resources and automatic decompilation of the Java class files into near-original source code. Attackers can then efficiently apply modifications it to implement hacks or create counterfeits for redistribution as an unauthorized or compromised version of the original application and for example resulting in a security risk and unauthorized copying of the application. Such Java applications are also being used in the context of mobile software applications, for example mobile software applications suitable for the Android operating system. In such a context Java source code of the mobile application is for example compiled to Dalvik bytecode and stored in .dex or Dalvik Executable files and/or .odex or Optimized Dalvik EXecutable files. This Dalvik bytecode can for example be subsequently executed by a Dalvik Virtual Machine, or alternatively be further compiled to native code on the mobile device by the Android Runtime or ART. During the build operation the application code, in the form of the Dalvik bytecode, for example in the form of one or more .dex files, is packaged together with further application items, such as for example resources, assets, certificates, a manifest file, etc. into an Android application package or APK for further distribution. Similarly as explained above tools are available to inspect the contents of such software packages, decompile its bytecode and enable efficient modification of application items such as for example application icons, logo's, etc., thereby leading to security risks and unauthorized copying of the application.

In order to provide compatibility with different configurations, resources of such Android applications, such as images, video files, audio files and strings from the source code of the application, are maintained independently from the source code and are grouped by type and configuration. Default resources are those that should be used regardless of the device configuration, and alternative resources are those that are designed for use in a specific configuration. It is clear that such externalised resources are susceptible to modification by means of a hacker. Such hacker can efficiently create an unauthorized, rebranded copy such an application by merely modifying or replacing the resources such as the image for the related icon, images with company logos, and other related resources used for the presentation of the application on the mobile device. Additionally the hacker might efficiently modify the decompiled source code in order to modify for example references to the web server of the original application developer to new references to of a different web server managed by the hacker.

ProGuard, available at http://proguard.sourceforge.net/, is a known software application for use during a build operation, which obfuscates Java source code by for example renaming the classes, fields, and methods using short meaningless names. An alternative known software application for use during the build operation is DexGuard available at http://www.guardsquare.com/dexguard. Dexguard focuses on the protection of mobile software applications, with additional features such as for example resource obfuscation, string encryption, class encryption, and executable application file splitting. DexGuard is focused on Android applications and directly creates Dalvik bytecode during the Android build operation in which Android programs are compiled into .dex or Dalvik Executable files, which are in turn packaged into a single software package or .apk file. Such source code or resource obfuscation increases the difficulty for a hacker to analyse the software code or to efficiently identify standard resources such as for example the application icon image. Such known Java obfuscators, during the build operation, make use of renaming of classes, fields, methods, etc., which increases the difficulty for reverse engineering the decompiled source code.

Additionally, more sophisticated applications such as DexGuard, also provide for renaming of application resource identifiers, such as the application resource file name, and corresponding obfuscated references in the corresponding source code. This increases the difficulty for efficiently rebranding such a software application by acting on the application resources. In order to still further increase the hurdle for hackers to interfere with the application source code and/or the application resources, encryption can be used. However, such encryption often relies on a standard encryption algorithm provided by applications such as for example DexGuard during the build operation and require use and distribution of standard security keys along with the packaged application in order to allow for subsequent decryption during execution of the software package on the mobile device. This provides the risk that hackers can scan for detectable encryption signatures and/or security keys, which allows them to develop a dedicated decryption application that allows decryption of all software applications obfuscated and encrypted by a particular obfuscation tool, such as DexGuard.

Still further known build systems and methods of operating such a build system are for example known from WO2011/057393 A1 of IRDETO CANADA CORP. The latter build system makes use of a plug-in mechanism to add and extend security capability and new protection. However, the distributed application comprises a Java bytecode protection security module which automatically decrypts the java application bytecode during execution. This know system further makes use of a Java application bytecode stub in order to access these protected data files and a white box security module utility. It is clear that, although this system provides for a plug-in mechanism, still, each of the above mentioned individual components could lead to the risk of detectable patterns or anchor points for an attacker with access to the distributed application, this is especially true for the protected application bytecode stub. It is further also clear that this build system is only able to increase the security level of the original application bytecode. Other items which are distributed such as for example application resources or application assets or other data items such as image data representative of icons or company logo's, databases, etc. are not handled by the Java Bytecode Protection Tool and thus remain accessible in a relatively easy way to an attacker with access to the distributed application. Still a further known build system which makes use of a combination of static watermarking and authentication method to determine whether the code has been modified and obfuscated symbolic names to increase security against modifications by unauthorized attackers is known from WO2004/023313 A1 (FRAUNHOFER CRCG). Similar as stated above the protection is limited to the class files of the mobile code, while application resources, etc. remain prone to an attack. Further the class loader, the static watermarking, the first and second associations which are processed by the class loader to resolve the obfuscated names, all could lead to detectable patterns for an attacker. Finally a further known build system is known from WO99/41651 (NATIONAL COMPUTER BOARD). This system involves encrypting bytecode for an application and encoding the decryption key in the encrypted bytecode. During run-time a code loader is executed which loads this decryption key and executes the decryption algorithm on the encrypted code. It is clear that the distributed code loader, decryption key, decryption algorithm, etc. could all lead to the risk of a detectable pattern for an attacker. Similarly as explained above also here only application bytecode is provided with an increased level of protection. Other items such as application resources, application assets, or other data items remain more easily accessible.

Therefor there still exists a need for an improved build system that is able to provide an increased level of resistance to hacking, by reducing the risk of identifiable patterns in the distributed application. There also remains a need for increasing the level of resistance to hacking for other application items than the application code, such as for example resources comprising data representative of text, images, audio, etc. of a distributed software package.

It is thus an objective of the present invention to disclose a system and method that overcomes the above identified shortcomings of the prior art. More particularly, it is an objective to disclose a system and method that, in an efficient, simple and flexible way, increases the level of resistance against unauthorised access to and modification of a distributed software package, especially with respect to resources other than the application code of mobile applications.

SUMMARY

According to a first aspect of the invention, there is provided a build system for generating an enhanced application comprising at least one encrypted application component during a build operation, said build system comprising:
　　a build tool configured to receive an application comprising application code and a plurality of application components; and
　　two or more build tool plugins coupled to said build tool during a build operation, the two or more build tool plugins each comprising an encryption module and a corresponding decryption module,
the build tool, during the build operation, configured to generate an enhanced application making use of the two or more build tool plugins, such that the enhanced application comprises enhanced application code and a plurality of at least partly encrypted application components and:
　　the plurality of at least partly encrypted application components generated from the plurality of corresponding application components by the encryption modules of the build tool plugins, such that:
　　　　at least one first at least partly encrypted application component is generated by the encryption module of a first build tool plugin;
　　　　at least one second at least partly encrypted application component is generated by the encryption module of a different, second build tool plugin, and
　　the enhanced application code generated by the build tool from the application code by respectively adding the corresponding decryption modules as corresponding added decryption modules, such that, during execution, when accessed by the enhanced application code:
　　　　the corresponding at least one first at least partly encrypted application component is automatically decrypted by the corresponding first added decryption module of the first build tool plugin; and
　　　　the corresponding at least one second at least partly encrypted application component is automatically decrypted by the corresponding second added decryption module of the second build tool plugin.

By making use of a plurality of different build tool plugins during the build operation, the risk for detectable patterns in the distributed application code is considerably reduced with respect to the prior art systems.

Several advantageous embodiments of the first aspect of the invention have been defined in the dependent claims in which for example the security level is increased by for example applying different build tool plugins at different times during the build operation, which will lead to a reduced likelihood of detectable patterns in the distributed application code. In order to still further reduce the likelihood preferably the at least partly encrypted first and/or second application components could be interwoven. This means that their data is so as to speak provided in the enhanced application in a kind of mixed or intertwined way, such that the likelihood of detectable patterns is still further reduced. This is particularly beneficial when the application components comprise data or a reference to data other than software code, such as for example text data, string data, image data, etc. or an application resource, an application asset, etc. which remained more easily accessible targets for modification by an attacker in prior art systems.

According to a second aspect of the invention there is provided A computer-implemented method for operating a build system according to the first aspect of the invention, the method comprising the steps of:

the build tool receiving the application comprising application code and the plurality of application component;

the build tool, during the build operation, generating, by making use of the encryption modules of the two or more build tool plugins, an enhanced application comprising the enhanced application code and a plurality of at least partly encrypted application components:

the encryption modules of the build tool plugins generating the plurality of at least partly encrypted application components from the plurality of corresponding application components, by:

generating at least one first at least partly encrypted application component by the encryption module of a first build tool plugin;

generating at least one second at least partly encrypted application component by the encryption module of a different, second build tool plugin, and the build tool generating the enhanced application code from the application code by respectively adding the corresponding decryption modules as corresponding added decryption modules, by, during execution, when accessed by the enhanced application code:

automatically decrypting the corresponding at least one first at least partly encrypted application component by the corresponding first added decryption module of the first build tool plugin; and automatically decrypting the corresponding at least one second at least partly encrypted application component by the corresponding second added decryption module of the second build tool plugin.

Several advantageous embodiments of the second aspect of the invention have been defined in the dependent claims in which the level of resistance by for example in addition to the use of two or more build tool plugins during the build operation, preferably performing the method of operating the build system iteratively and preferably applying the subsequent iterations particularly to items such as the added decryption modules or added decryption keys of a previous iteration, thereby still further decreasing the likelihood that these items could lead to detectable patterns or anchor points for an attacker.

According to a further aspect of the invention there is provided a build system for generating an enhanced application comprising at least one encrypted application component during a build operation, said build system comprising:

a build tool configured to receive an application comprising application code and at least one application component; and at least one build tool plugin coupled to said build tool during a build operation, the build tool plugin comprising an encryption module and a corresponding decryption module, the build tool, during the build operation, configured to generate an enhanced application comprising at least one at least partly encrypted application component and enhanced application code:

the at least one at least partly encrypted application component generated by the encryption module from the at least one application component, and the enhanced application code generated by the build tool from the application code by respectively adding the corresponding decryption module as a corresponding added decryption module, such that, during execution, when accessed by the enhanced application code, the corresponding at least partly encrypted application component is automatically decrypted by the corresponding added decryption module.

In this way the build tool plugin allows for additional flexibility in providing dedicated encryption and decryption modules, which implement dedicated encryption and decryption algorithms. This provides for the flexibility to divert from built-in algorithms of standard build tools, thereby decreasing the likelihood that a standard tool for decryption of the enhanced application code is available to an attacker. Additionally, by only adding the decryption module to the enhanced application code of the enhanced application for further distribution, there is no easy reference or pointer to the used encryption algorithm of the encryption module available to an attacker. Thereby the resistance against unauthorised access to and modification of the enhanced application, when for example distributed as software package, is increased.

According to an embodiment, there is provided a build system, characterised in that the at least one application component respectively comprises one or more of the following:

data;
a reference to data;
software code,
which, during execution are accessed by the enhanced application code.

In this way security sensitive application components, such as for example security sensitive data files, configuration files comprising references to security sensitive data, security sensitive software code, etc. can be encrypted without the need to make the used encryption algorithm of the encryption module public and without the need to add a reference to the used encryption algorithm to the at least partly encrypted application component to enable decryption. The added decryption module added to the enhanced application code during the build operation suffices to enable decryption during execution of the application. It is clear that from the advantageous embodiments mentioned below, preferably the decryption module is added to the enhanced application code in an obfuscated way. This means in a way that also the risk is reduced for detectable patterns in the enhanced application code, which could lead an attacker to detection of a decryption module.

According to a further embodiment, there is provided a build system, characterised in that the at least one application component respectively comprises one or more of the following:

data representative of or comprising one or more of the following:
text data, string data, image data, audio data, video data, animation data, layout data, style data, color data, menu data, configuration data, metadata, tokens;
an application resource;
an application asset;

a reference to data comprising one or more of the following:
an identifier;
a name;
a numerical identifier;
an application resource identifier;
an application asset identifier;
software code comprising one or more of the following:
a part of the application code
further application code, separate from the application code;
further application code in a programming language different from the application code;
native code;
bytecode;
source code.

In this way, options for an attacker to efficiently rebrand a distributed application or to efficiently modify for example security critical components of the distributed application are reduced. These application components could for example be data files such as for example application resources, etc. The application components could alternatively comprise critical parts of data files, such as for example the header of an image file comprising the encoding protocol used, etc. According to still further alternative embodiments the application components could comprise references to sensitive data such as for example names or identifiers of files, resources, variables, etc. comprised in configuration files or application code, etc. According to still further alternatives, the application component could for example be a security sensitive software library, a dedicated driver provided in native code, etc. Each of these application components can be advantageously encrypted, or at least partly encrypted, without the need to disclose the encryption module during distribution of the enhanced application as decryption can be ensured by decryption module added to the enhanced application.

According to a further embodiment, there is provided a build system, characterised in that the build tool is configured to:
receive the application as an input software package comprising the application code and the at least one application component; and
to generate the enhanced application as an output software package comprising the enhanced application code and the at least one at least partly encrypted application component.

In this way the build tool can integrate easily with or in the chain of operations of existing automated build tools, which receive and generate software packages comprising different application components, such as application code, application resources, etc.

According to a further embodiment, there is provided a build system, characterised in that enhanced application does not comprise the encryption module, and/or a reference to the encryption module.

In this way the hurdle for an attacker for detecting a pointer to the encryption algorithms used by the encryption module during the build operation is increased.

According to a further embodiment, there is provided a build system, characterised in that the build tool is configured to generate the added decryption module as one or more of the following:
a copy of the decryption module;
a converted version of the decryption module;
a compiled version of the decryption module;
an obfuscated version of the decryption module;
a transformed but functionally equivalent version of the decryption module.

It should thus be clear that the build tool according to a particularly simple embodiment, for example when both the decryption module and the application code are provided in bytecode, could generate the enhanced application code by simply adding a copy of the bytecode of the decryption module at the correct location to the bytecode of the application code. It is further also clear that the decryption module and the application code could for example be provided in different types of source code, for example each comprising source code in a different programming language, the decryption module comprising native code and the application program comprising bytecode, the decryption module and the application program comprising a different type of bytecode, etc. In such a case the build system will generate the added decryption module by providing a suitably converted version of the decryption module, which allows for an efficient addition to the application code for generation of the enhanced application code. It is further also clear that, for example when the decryption module is provided in source code, the build tool could add a compiled version, for example a version of the decryption module compiled to bytecode, to the enhanced application code. This enhanced application code, could in such a case, for example also be a compiled version to bytecode of the source code of the application code. It is clear that in such a case the source code of the application code and the decryption module do not necessarily need to be in the same programming language. It is clear that preferably, instead of merely adding an exact copy of the decryption module in its entirety to the application code, preferably an obfuscated version of the decryption module is added for example by modifying variable names, etc. of the decryption module, by distribution of different parts of the description module at different locations of the enhanced application code, and/or by means of any other suitable obfuscation technique available which reduces detectability of patterns related to the decryption module. In general preferably the added decryption module is a transformed but functionally equivalent version of the decryption module.

According to a further embodiment, there is provided a build system, characterised in that the build tool is further configured to add, during the build operation, the decryption module to the enhanced application as an added decryption module comprising two or more separate decryption module parts at different locations in the enhanced application code.

By means of this advantageous and simple obfuscation technique applied to the decryption module the risk for detectable patterns of the decryption modules in the enhanced application when distributed is still further reduced, thereby still further increasing the level of resistance against attackers.

According to a further embodiment, there is provided a build system, characterised in that the build system comprises two or more build tool plugins, the build tool being configured to make use of a different build tool plugin at different times during the build operation.

The use of multiple build tool plugins and a corresponding multitude of encryption and corresponding decryption modules still further increases dedicated variety for the type of encryption used, thereby further reducing the likelihood that an attacker will be able to perform decryption of the enhanced application by means of standard tools. Additionally this is realised in a flexible and efficient way by the build tool during the build operation by means of adding the corresponding multiple decryption modules in the enhanced application code, without providing an attacker any pointers to which particular encryption algorithm was used during the build operation. Additionally this approach allows such variation in the use of encryption to be applied during the build operation without the need for keeping track of when and which particular encryption module was used in the enhanced application. During execution of the enhanced application the corresponding decryption modules added by the build tool during the build operation at the relevant locations in the enhanced application code suffices to enable automatic decryption of the encrypted application components when accessed during execution.

According to a further embodiment, there is provided a build system, characterised in that the build tool is configured to generate for a decryption module of a build tool plugin different variations of the added decryption module at different times during the build operation.

In this way the added decryption module in the enhanced application is further obfuscated by the build tool during the build operation without unduly increasing complexity for execution of the source code.

According to a further embodiment, there is provided a build system, characterised in that:
the encryption module comprises two or more encryption algorithms and the decryption module comprises two or more corresponding decryption algorithms, and in that
at different times during the build operation, the build system is further configured to:
encrypt application components by means of different encryption algorithms; and
add different corresponding added decryption algorithms in the enhanced application code generated from the different corresponding decryption algorithms.

The use of multiple encryption algorithms still further increases dedicated variety for the type of encryption used, thereby further reducing the likelihood that an attacker will be able to perform decryption by means of standard tools. Additionally this is realised in a flexible and efficient way by means of adding the corresponding multiple decryption algorithms in the enhanced application code, without providing an attacker any pointers to which particular encryption algorithm was used during the build operation. It is clear that this augmented level of obfuscation of the added decryption module is realised by the build system during the build operation, without unduly increasing complexity of the enhanced application for execution of the source code. Preferably, at different times during the build operation the build tool plugin, by means of its encryption module, is configured to encrypt application components by means of different encryption algorithms. It is clear that in this way the build tool does not need to be aware whether the build tool plugin comprises different encryption algorithms, as preferably the encryption module of the build tool plugin will automatically determine which of the encryption algorithms to use when provided with a sensitive application component by the build tool during the build operation. The build tool is preferably configured to add the decryption module of the build tool plugin as an added decryption module comprising different corresponding added decryption algorithms in the enhanced application code. It is clear that, the added decryption module is added to the enhanced application code in such a way that the added decryption module automatically selects the corresponding added decryption algorithm when the enhanced application code accesses an encrypted application component during execution of the enhanced application.

According to a further embodiment, there is provided a build system, characterised in that the build system is further configured to encrypt the application components by means of the different build tool plugins and/or different encryption algorithms according to one or more of the following:
randomly;
in function of the data size of the application component;
in function of the data type of the application component;
in function of one or more properties of the application component;
in function of one or more other properties, and preferably in that the selected different build tool plugins and/or different encryption algorithms are combined:
sequentially;
such that a selection of the first build tool plugin is subsequently followed by a selection of the second build tool plugin and/or such that a selection of a first encryption algorithm is subsequently followed by a selection of a second encryption algorithm;
iteratively;
in different locations or overlapping locations.

In this way the hurdle for an attacker is still further raised as for example random use of different algorithms decreases the likelihood of detectable patterns. Additionally this is realised without any additional complexity for the distributed application as providing the correlation between the randomly distributed decryption algorithms and the encrypted applications is provided for during the build operation and does not lead to excessive complexity during the execution of the application.

Further, performance optimizations during the build operation and/or during the execution of the enhanced application code can be realized. For example application components comprising data size smaller than a predetermined threshold could for example be processed by means of a more secure, but also more resource intensive encryption and/or decryption modules. While application components comprising a data size larger than this threshold could for example be processed by means of less secure, but more resource efficient encryption and/or decryption module. According to still further embodiments, for example an application component comprising image data might be processed by means of a different encryption and corresponding decryption module than an application component comprising text data. As image data, unlike text data, comprises some special characteristics like high levels of redundancy and high levels of correlation among data of different pixels, use of encryption modules optimized for processing such image data can result in efficiency increases during build time and addition of corresponding decryption modules to the enhanced application during the build operation can result in an increased computational efficiency during execution of the enhanced application. According to still further embodiments, in general, the use of different build tool plugins and/or different encryption algorithms could be a function of one or more properties of the application component, such as for example security properties, file attributes, version properties, metadata, etc.

According to a further embodiment, there is provided a build system, characterised in that A build system according to any of the preceding claims, characterised in that the build tool plugin further comprises a security key generator configured to generate encryption keys for use by the encryption module during the build operation and corresponding decryption keys for use by the added decryption module during execution, and wherein the build tool, during the build operation, is further configured to generate the enhanced application by adding the decryption keys as added decryption keys, such that during execution, when accessed by the enhanced application code, the corresponding at least partly encrypted application component is automatically decrypted by the corresponding added decryption module making use of the corresponding added decryption keys.

The use of security keys in the build tool plugin still further increases flexibility for providing a dedicated form of encryption, which diverts from the standard approach and security keys of off-the-shelf build tools, thereby still further increasing resistance of the distributed application items to an attacker. It is clear that in addition to the increased diversity of the security keys used, which contributes to an increased resistance to tampering of the enhanced application when distributed, additionally resistance can still further be increased by for example further layers of encryption or obfuscation of the added decryption keys in the enhanced application code by the build tool during the build operation.

According to a further embodiment, there is provided a build system, characterised in that the key generator is further configured, during the build operation, to automatically generate different encryption and corresponding decryption keys:
  randomly;
  in function of the data size of the application component;
  in function of the data type of the application component;
  in function of one or more properties of the application component;
  for each application component;
  for each predetermined group of application components; and/or
  for each encryption module and corresponding decryption module,
and preferably in that the generated different encryption and corresponding decryption keys are combined:
  sequentially;
  such that a generation of a first encryption and corresponding decryption key is subsequently followed by a selection of a second encryption and corresponding decryption key;
  iteratively;
  in different locations or overlapping locations, the build tool configured to generate the enhanced application such that, during execution, the different added decryption keys are accessed by the corresponding added decryption module when automatically decrypting the corresponding at least partly encrypted application component.

In this way the repeated use of identical security keys in the enhanced application code is minimized, and the likelihood of detectable patterns for an attacker are still further reduced. Still further security and performance optimizations can be obtained by choosing a type of security that is well suited to efficiently cooperate with an optimal type of encryption module and/or corresponding decryption module for a particular type of data. Additionally, for example for application components with a data size smaller than a predetermined threshold the encryption and corresponding decryption key size could be chosen larger than for application components with a data size larger than the threshold. This for example ensures a high level of security for relatively small text strings comprising less than 10 kB of data, while ensuring computational efficiency when encrypting and decryption for example larger image or video files comprising several MB or GB of data. According to still further embodiments the use of different security keys could be a function of one or more other properties of the application component, such as for example security properties, file attributes, version properties, metadata, etc.

According to a further embodiment, there is provided a build system, characterised in that the build tool is further configured to add, during the build operation the decryption key to the enhanced application, as an added decryption key comprising two or more separate decryption key parts at different locations in the enhanced application.

In this way the likelihood of detectable patterns for an attacker, when in search for pointers to the added decryption keys in the enhanced application code, is further reduced. By adding the decryption key parts and the decryption module during the build operation by means of the build tool in such a way that during a subsequent execution of the enhanced application, when accessing an encrypted application component, the corresponding decryption module will be triggered to make use of the corresponding decryption key parts, this level of variation and obfuscation at the level of the security keys can be realised during the build operation without the need to subsequently keep track of the different key parts and corresponding encryption modules used.

According to a further embodiment, there is provided a build system, characterised in that the build tool is further configured to add, during the build operation the decryption key to the enhanced application, as an added decryption key which is at least partly interwoven with another added decryption key and/or an added at least partly secured application component.

In this way the likelihood of detectable patterns for an attacker, when in search for pointers to the decryption keys added to the enhanced application code is still further reduced.

According to a further embodiment there is provided a build system, characterised in that the build system is further configured to receive an application of which:
  the application code comprises at least one of the application components; and/or
  the application comprises at least one application component in addition to the application code.

It is clear that this means that such an application component could for example be a sensitive part of the application code, such as for example a part of a file comprising application code. The application component could for example comprise a sensitive variable and/or its corresponding value, a reference in the application code to a sensitive application resource, such as for example a name, file name or any other suitable identifier of a configuration file or an application resource comprising an image for the icon or logo of the application, etc. It is also clear that the application code could be provided as a set of files, for example files comprising a main part of the application code as source code and other files for example comprising dedicated drivers provided in native code or application modules provided in bytecode. In such a case the application component could for example be a sensitive file of this collection of files, for example a file comprising a sensitive part of the application code or comprising native driver code of which independent distribution is to be avoided, etc.

It is clear that alternatively the application component could be a part of the application different from the application code itself. The application component could for example be a sensitive software library, a data file comprising image data for the logo or icon of the application, a configuration file comprising configuration information, a security sensitive files comprising security keys, tokens, etc.

According to a further embodiment there is provided a build system, characterised in that the build system is further configured to generate an enhanced application of which:
  the enhanced application code comprises at least one of the at least partly encrypted application components.

It is clear that in this way for example the enhanced application code could comprise an encrypted application component, such as for example an encrypted name, identifier, text string, a sensitive definition of a variable, method or class, etc.

According to a further embodiment there is provided a build system, characterised in that the build system is further configured to generate an enhanced application of which:
  the enhanced application comprises at least one at least partly encrypted application component in addition to the enhanced application code.

It is clear that in this way for example the at least partly encrypted component could for example be an at least partly encrypted software library, configuration file, image file, etc.

According to a further embodiment there is provided a build system, characterised in that the build system is further configured to generate an enhanced application of which:
  the enhanced application comprises at least one at least partly encrypted application component which is partly comprised within the enhanced application code and partly added to the enhanced application in addition to the enhanced application code.

It is clear that for example for security keys or other sensitive data, a first part could for example be added to the enhanced application code, for example together with the corresponding decryption module, and a second part could for example be added to another file of the enhanced application, such as for example a data file, configuration file, image file, a file comprising software code other than the application code, etc.

According to a further embodiment there is provided a build system, characterised in that the build system is further configured to generate an enhanced application of which:
  the enhanced application comprises at least two at least partly encrypted application components which are interwoven.

In this way encrypted application components are further obfuscated and the hurdle for subsequent decryption of these parts of the enhanced application is further increased.

According to a further embodiment, there is provided a build system, characterised in that the build system is further configured to add the respective corresponding decryption module in the form of bytecode in the enhanced application code. The use of bytecode by the build tool for adding the decryption module to the bytecode of the enhanced application is preferred as this simplifies addition of the decryption module in the desired automated way at the correct location in the code of the enhanced application. However it is clear that alternative embodiments are possible in which there is made us of source code, binary code, native code or any other suitable collection of computer instructions.

According to a further aspect of the invention, there is provided a computer-implemented method for operating a build system according to the first aspect of the invention, the method comprising the steps of:
  the build tool receiving the application comprising application code and the at least one application component;
  the build tool, during the build operation, generating an enhanced application comprising at least one at least partly encrypted application component and enhanced application code:
    the encryption module generating the at least one at least partly encrypted application component from the at least one application component, and
    the build tool generating the enhanced application code from the application code by respectively adding the corresponding decryption module as a corresponding added decryption module, such that, during execution, when accessed by the enhanced application code, the corresponding at least partly encrypted application component is automatically decrypted by the corresponding added decryption module.

According to an embodiment there is provided a computer-implemented method, wherein the method comprises the steps of performing the method of operating the build system iteratively, such that the application received by the build system for performing a subsequent iteration of the method of operating the build system at least partly comprises the enhanced application generated by the build system during a previous iteration of the method of operating the build system.

In this way multiple independent layers of security can be realised during the build operation, without causing additional requirements for distribution and execution of the enhanced application as the required decryption modules are available in the enhanced application itself at the time when automated decryption is needed during execution of enhanced application.

According to a further embodiment, there is provided a computer-implemented method, characterised in that the method comprises the steps of:
  selecting as application components for the subsequent iteration at least an added decryption module and/or an added decryption key of the enhanced application generated during the previous iteration; and
  generating at least partly encrypted application components from these selected application components during the subsequent iteration.

By treating decryption modules and/or decryption keys added to an enhanced application as sensitive application components during a subsequent iteration, this realises a multi-layered level of security during the build operation, which can be resolved during execution of the enhanced application after subsequent distribution automatically and efficiently without requiring any external resources.

According to a further aspect of the invention, there is provided a computer program comprising software code adapted to perform the computer-implemented method according to the above mentioned aspect of the invention when executed by a computing system.

According to a further aspect of the invention, there is provided a computer readable storage medium comprising computer-executable instructions which, when executed by a computing system, perform the computer-implemented method according to the above mentioned aspect of the invention.

BRIEF DESCRIPTION OF THE DRAWINGS

FIGS. 2 to 9 schematically show alternative embodiments of the build system similar to the embodiment of FIG. 1;

DETAILED DESCRIPTION OF EMBODIMENT(S)

Figure 1:
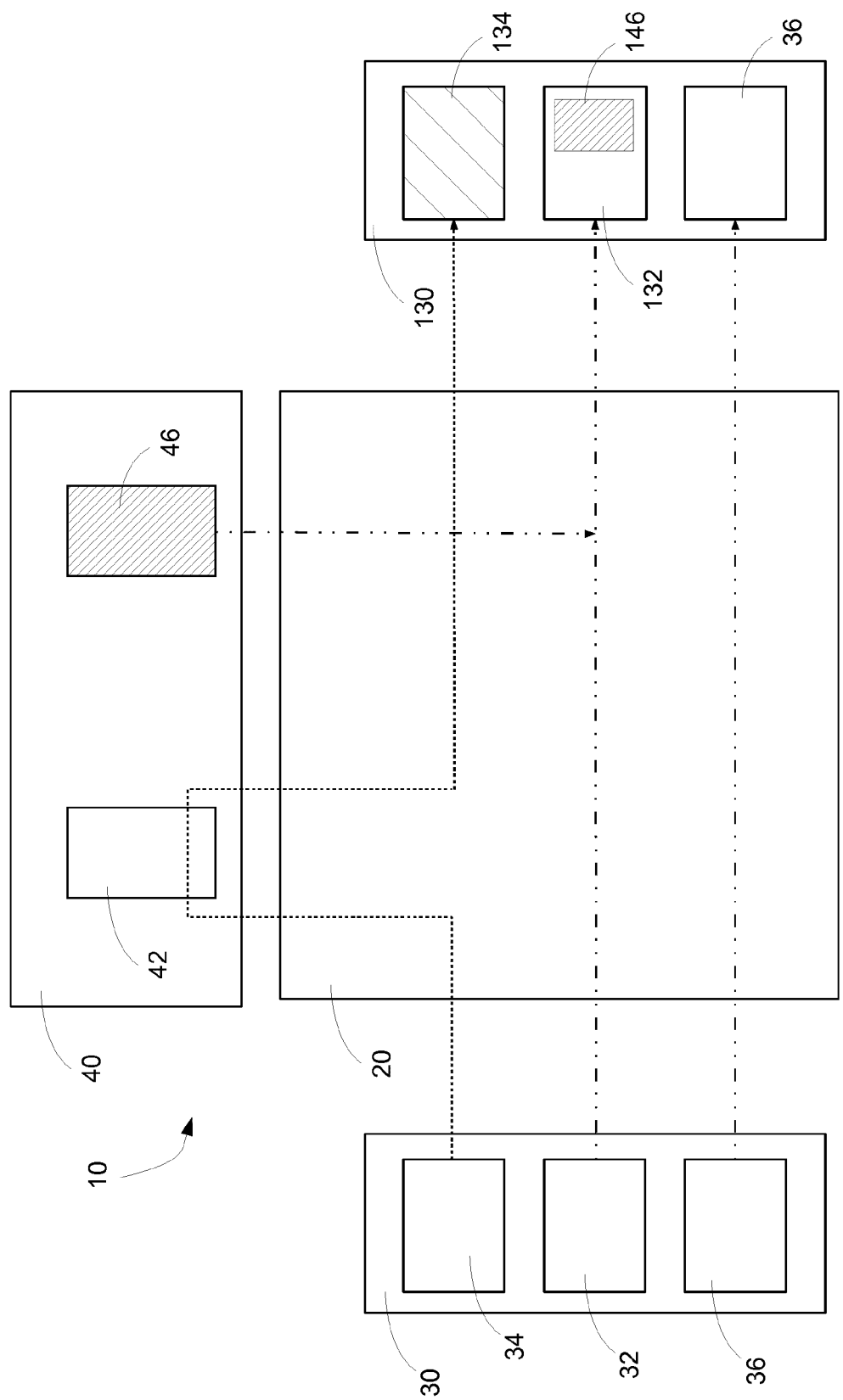
FIG. 1 schematically shows an embodiment of the build system.

FIG. 1 schematically shows an embodiment of a build system 10. Such a build system 10, which is a software tool or a collection of software tools, is used during a software development process. Such a software development process concerns for example core activities such as design, construction, testing, debugging, deployment, maintenance, etc., resulting in the creation or further development of software applications or computer programs. Typically such a build system 10 comprises one or more software tools used to build a software application during a build operation. Typically during such a build operation a software application is produced in the form of a software package, which is suitable for further distribution. It is clear that the software development phase of which the build operation is part of, in this way is different from execution of the software application. When the software application is executed or run, this means that a suitable computing system executes the instructions of the software application. Typically this means that the distributed software application will comprise machine code instructions or binary code for a Central Processing Unit or CPU of the computing system; or alternatively more portable instructions, such as for example bytecode, for a software interpreter available on the computing system.

During a build operation a build tool will typically perform or coordinate a plurality of different operations in order to deliver the necessary components for a distributable software application, such as for example one or more of the following: generation or modification of source code; compilation of source code; compilation of test source code; execution of tests; packaging compiled source code, metadata, libraries and resources such as for example text, images, sound, etc. into a software package suitable for distribution; etc. It is clear that next to compilation of the source code of the application to bytecode or binary code, also other operations are performed during the build operation. Some of these operations might involve modification of at least a part of the source code of the application before a compilation operation and/or some of these operations might involve modification of at least a part of the bytecode or binary code of the application after compilation. In general source code, bytecode, binary code or any other suitable collection of computer instructions of the software application will be referred to as application code. It is also clear that, in addition to application code, the application could also comprise, as explained above, other data items such as for example application resources or application assets, etc., which for example comprise text data, image data, audio data, video data, animation data, layout data, style data, color data, menu data, configuration data, metadata, etc.

As shown in FIG. 1, according to this embodiment the build system 10 comprises a build tool 20. The build system 10 further also comprises a build tool plugin 40 coupled to the build tool 20. Examples of such a build system 10 are for example Android Studio, Eclipse, Gradle, Ant, Maven, etc. According to the embodiment shown, build tool 20 could for example be similar to known build tools such as ProGuard, DexGuard, which integrates in build system 10 or can be run as a standalone application part of the build operation. The build tool plugin 40 is a software component that provides customizable encryption functionality to an existing build tool 20. However it is clear that still further alternative embodiments are possible, as long as in general the build system 10 comprises a build tool 20 and a build tool plugin 40 coupled thereto with functionality to at least partly encrypt at least one application component 34 of an application 30 received by the build tool 20 during a build operation.

According to the embodiment shown in FIG. 1 the build tool 20 receives an application 30. According to this embodiment the application 30 is for example received as an input software package. The embodiment of the application 30 comprises application code 32, an application component 34 and a further application component 36. The application code 32 could for example comprise one or more files or any other suitable objects each comprising at least a part of the application code 32 in the form of source code or bytecode. According to a particular embodiment the application component 34 could for example be a file or any other suitable object comprising data, such as for example data text data, image data, audio data, configuration data, etc., which is often referred to as an application resource or application asset. According to a particular embodiment the application component 34 could for example comprise image data for a logo used in the user interface of the application during execution. As will be described in further detail below, it is clear that alternative embodiments of such an application component 34 are possible, as long as in general the application 30 received by the build system 10 comprises application code 32 and at least one application component 34 in addition to the application code 32 similar as shown in FIG. 1; and alternatively or in combination this application 30 comprises application code 32 comprising at least one of the application components 34. In general, as will be described in more detail below such an application component 34 can be referred to as a sensitive application component 34, which means that it is an application component 34 of the application 30 received by the build system 10 for which it is desired that access to it is preferably restricted after distribution, for example when incorporated in a distributed software package which is generated during the build operation. According to the embodiment shown in FIG. 1, the further application component 36 could for example be a file or any other suitable object comprising for example an application library. According to this embodiment this further application component 36 is different from the sensitive application component 34 in that it is not a sensitive application component for which access after distribution needs to be restricted. As further shown, according to the embodiment of FIG. 1, the build tool 20, during a build operation, generates an enhanced application 130 comprising an encrypted application component 134, enhanced application code 132 and a non-encrypted further application component 36. The enhanced application 130 could for example be generated by the build tool 20 as a suitable output software package, which according to this embodiment comprises the encrypted application component 134, enhanced application code 132 and a non-encrypted further application component 36.

According to an exemplary embodiment, the application 30 could for example be embodied as one or more directories comprising the relevant files for the respective application code and application components of the application. According to an alternative embodiment the application 30 could for example be provided as a JAR or Java Archive package file typically used to aggregate in an archive file application code for example comprising application code 32 in the form of Java class files, together with one or more sensitive application components 34 such as for example files comprising associated metadata and resources such as text, images, etc. or alternatively a specific item or part of the application code and/or files comprising further application code, and optionally further non-sensitive application components 36, such as for example data, code or libraries, which are not to be encrypted. It is clear that still further alternative embodiments for such an application 30 and/or a corresponding input software package are possible, such as for example an Android application package or APK, ZIP or any other suitable archive file comprising one or more files or directories that may have been compressed, WAR or Web application archive, AAR or a binary distribution package of an Android Library Project, Enterprise Archive or EAR, etc. Similar, exemplary embodiments, as described above with reference to the application 30 and a corresponding input software package are also possible for the enhanced application 130 and a corresponding output software package. It is clear that the input software package of the application 30 and the output software package of the enhanced application 130 do not necessarily need to be embodied as the same type of software package. The input software package of the application 30 received by the build tool 20 could for example be a JAR file, while the output software package of the enhanced application 130 generated by the build tool 20 could for example be an APK file.

As further shown in FIG. 1, the build tool plugin 40 comprises an encryption module 42 and a decryption module 46. During a build operation the build tool plugin 40 is coupled to the build tool 20. During such a build operation, the build tool 20 generates an enhanced application 130. As already mentioned above, according to the embodiment shown, this enhanced application 130 comprises the encrypted application component 134, the enhanced application code 132 and the further non-encrypted, non-sensitive application component 36. As will be described in further detail below, it is clear that alternative embodiments of the enhanced application 130 are possible as long as in general it comprises at least one at least partly encrypted application component 134 and enhanced application code 132. According to the embodiment shown in FIG. 1, the encryption module 42 is for example a programming module comprising an encryption algorithm and the decryption module 46 is for example a programming module comprising a corresponding decryption algorithm. The encryption algorithm and corresponding decryption algorithm could for example be any suitable encryption algorithm and corresponding decryption algorithm, such as for example an AES or Advanced Encryption Standard encryption and corresponding decryption algorithm making use of a particular security key. However it is clear that any other suitable encryption and corresponding decryption algorithm could be chosen for use in respectively the encryption module and the decryption module. The use of the build tool plugin 40, allows for flexibility in the choice of a particular encryption and corresponding decryption module. Even when for example making use of a standard build tool 20 a developer of an application, by making use of the build tool plugin, is not restricted to a particular set of encryption and decryption algorithms provided by this standard build tool 20. Instead the build tool plugin 40, by means of the encryption module and decryption module, allows the developer of the application to make use of a specific selection of encryption and corresponding decryption algorithms, or even dedicated encryption and corresponding decryption algorithms. Even when the algorithms provided by the encryption module and decryption module are simpler and more efficient then standard algorithms typically distributed with such standard build tools 20, still a higher level of security of encrypted application components 134 can be ensured. As such a more flexible and/or dedicated build tool plugin 40 comprising such an encryption and decryption module provides for an encryption approach that allows for more variation and that is less common than standard encryption approaches provided by standard build tools 20 themselves, the likelihood that a corresponding decryption tool will be available to a hacker is smaller.

As schematically shown in FIG. 1, according to this embodiment, the encryption module 42 of the build tool plugin 40 generates the encrypted application component 134. The encrypted application component 134 is for example generated by executing the encryption module and applying the encryption algorithm to the application component 34 during the build operation. According to the embodiment shown, the application component 34 is encrypted entirely when generating the encrypted application component 134, however according to alternative embodiments the application component 34 is only encrypted partly thereby generating a partly encrypted application component 134. In general the encryption module 42 thus generates at least one at least partly encrypted application component from at least one application component 34 of the application 30.

As further shown, according to the embodiment of FIG. 1, the decryption module 46 of the build tool plugin 40 is added to the application code 32, thereby generating an enhanced application code 132 during the build operation. This enhanced application code 132 is generated by the build tool 20 during the build operation. As shown, the build tool 20, when generating the enhanced application code 132 during the build operation, adds the decryption module 46 to the enhanced application code 132 as a corresponding added decryption module 146. In this way the enhanced application code 132 comprising the added decryption module 146 is generated by the build tool 20 for the enhanced application 130. When this enhanced application code 132 is executed, at times when the enhanced application code 132 accesses the encrypted application component 134, the added decryption module 146 present in the enhanced application code 132 will be called to automatically decrypt the encrypted application component 134. It is thus clear that in this way the encrypted application component 134 of the enhanced application 130 can be decrypted automatically during run-time of the enhanced application 130 by means of this added decryption module 146. It is further clear that this automatic decryption during run-time of the enhanced application 130 can take place without requiring knowledge of or a reference to the encryption algorithm used by the encryption module 42 in the enhanced application code 132 or any of the application components of the enhanced application 130.

The automatic decryption of the encrypted sensitive application component 134, when it is accessed by the enhanced application code 132 during execution, is made possible by the corresponding added decryption module 146 that was added in the enhanced application code 132. In this way the enhanced application code 132 of the enhanced application 130, during execution, is able to access a decrypted version of the encrypted application component 134, and is for example according to this embodiment able to access the data, for example the image data of a logo for display in the user interface of the application during run-time. It is clear that further alternative embodiments are possible, especially as already mentioned above when the encryption module 42 of the build tool plugin generates at least one at least partly encrypted application component comprised for inclusion in the enhanced application by the build tool. In general the enhanced application code 132 is generated by the build tool 20 from the application code by respectively adding the corresponding decryption module 46 as a corresponding added decryption module 146. This is done in such a way that during execution of the enhanced application, when an at least partly encrypted application component 134 is accessed by the enhanced application code 132, the at least partly encrypted application component 134 is automatically decrypted by the corresponding added decryption module 146.

As further shown, according to the embodiment of FIG. 1, the build tool 20 also adds a non-encrypted, non-sensitive further application component 36 to the enhanced application 130. This non-encrypted, non-sensitive further application component could for example be a non-encrypted version of the non-sensitive further application component 36 of the application 30 received by the build tool 20. During the build operation, the build tool 20 could leave this non-sensitive, further application component 36 unchanged or alternatively subject this non-sensitive, further application component 36, to one or more operations, such as for example compilation, testing, etc., as long as the non-sensitive further application component 36 is not subjected to an encryption operation by the build tool plugin 40.

Figure 2:
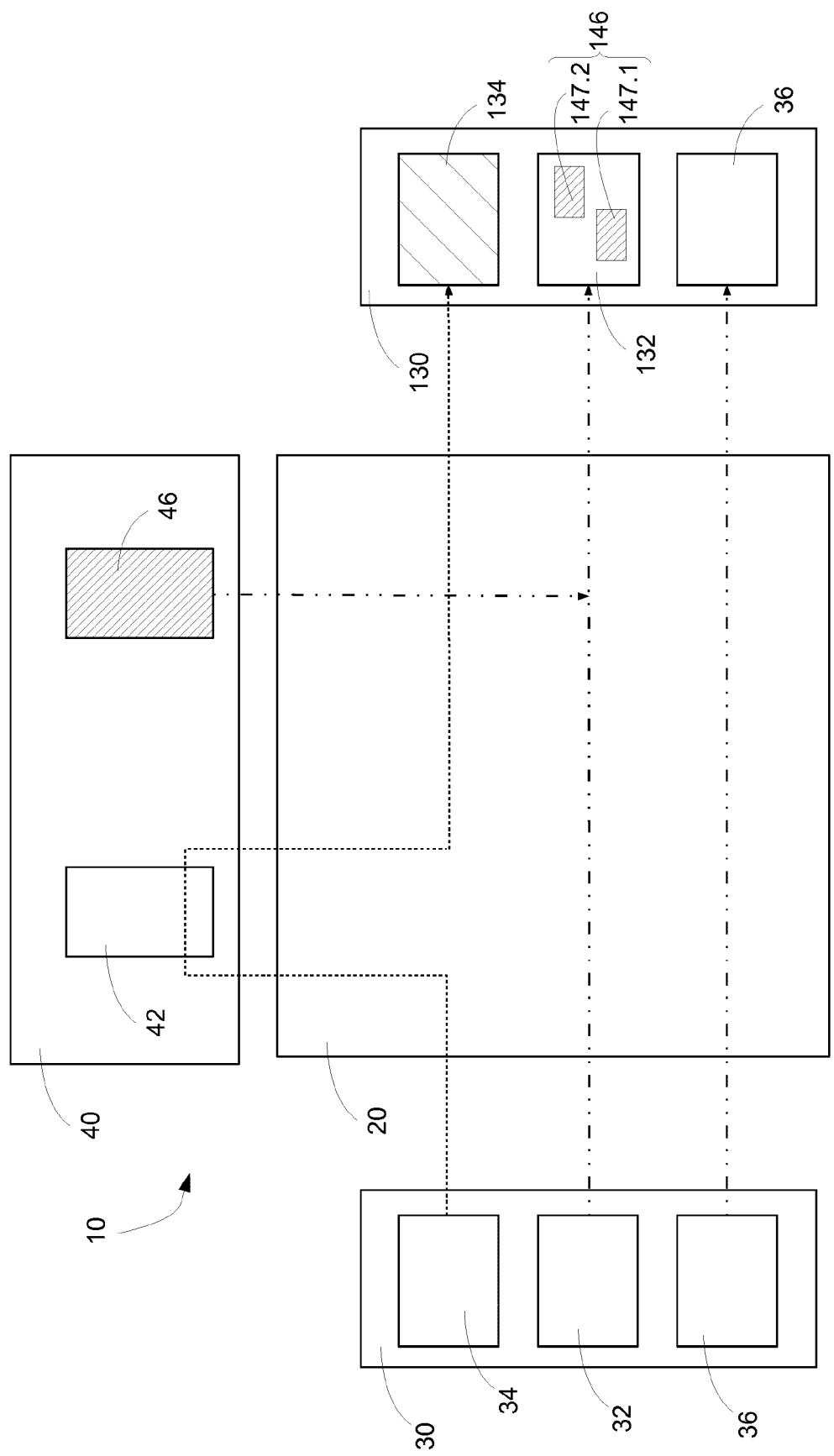

FIG. 2 shows an alternative embodiment of the build system 10, similar to the embodiment described with reference to FIG. 1. Similar elements have been provided with similar references and generally function as described above with reference to FIG. 1. The main difference, as shown, is related to the operation of the build tool 20 when adding the decryption module 46 of the build tool plugin 40 as an added decryption module 146 to the enhanced application code 132 of the enhanced application 130 during the build operation. As shown, according to the embodiment of FIG. 2, here the added decryption module 146 is added in the enhanced application code 132 by the build tool 20 during the build operation in an obfuscated way by means of two separate decryption module parts 147.1 and 147.2 at different locations in the enhanced application code 132. Especially in such an embodiment it is preferable that the build system 10 generates an added decryption module 146 in the form of bytecode for addition to the enhanced application code, which preferably is also in the form of bytecode. This eases insertion of the decryption module 146 into the enhanced application code 132 during the build operation and also eases obfuscation by for example splitting the added decryption module 146 into two or more decryption module parts 147.1, 147.2 to be inserted at different locations in the enhanced application code 132. It is clear that alternative embodiments are possible, which instead of byte code for example make use of source code or binary code for the added decryption module 146 and/or the enhanced application code 132 into which the added decryption module 146 is inserted. However, automatic insertion of the decryption module at a correct location in the enhanced application code 132 and/or splitting the added decryption module 146 in a correct way in two or more decryption module parts 147.1, 147.2 is then often more complex. It is further also clear that alternative embodiments are possible, especially in relation to the number of decryption module parts 147.1, 147.2 into which the added decryption module 146 is split.

As long as in general the added decryption module 146 is split into two or more corresponding decryption module parts 147.1, 147.2 which are added into the enhanced application code 132 at different locations.

Figure 3:
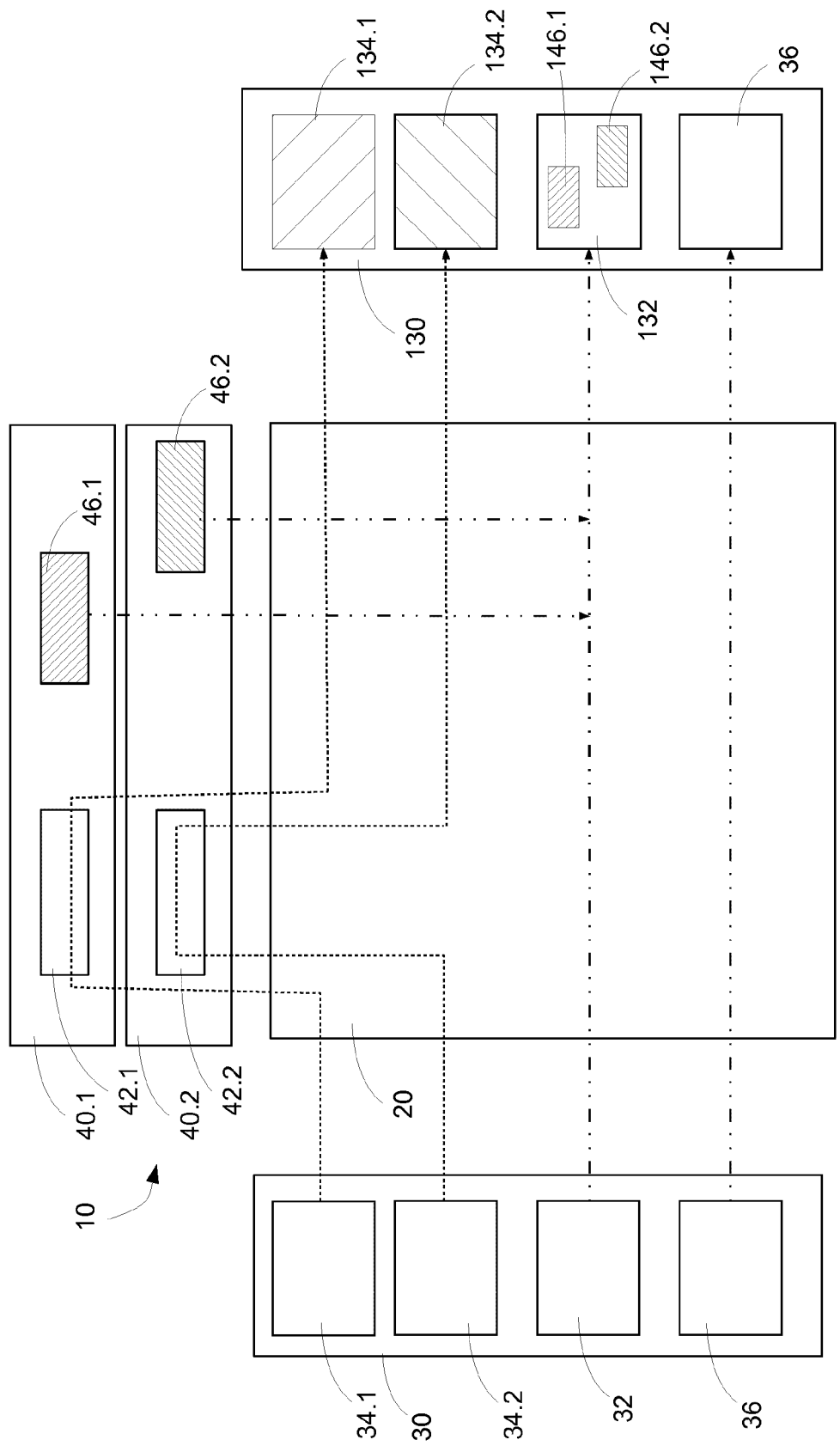

FIG. 3 shows still a further alternative embodiment similar to the embodiment of the build system 10 of FIG. 1. Similar elements have been provided with similar references and generally function as described above with reference to FIG. 1. The main differences are that the embodiment of the build system 10 comprises two build tool plugins 40.1, 40.2 and that the build tool 20 receives an application 30 that comprises two sensitive application components 34.1, 34.2. As shown, according to this embodiment sensitive application component 34.1 is encrypted by means of the encryption module 42.1 of the build tool plugin 40.1 during the build operation. As further shown, the further sensitive application component 34.2 is encrypted by means of the different encryption module 42.2 of the different build tool plugin 40.2 during the build operation. According to the embodiment shown in FIG. 3, the different sensitive application components 34.1 and 34.2 are thus encrypted by different encryption modules 42.1, 42.2 during the build operation. As further shown, both the different respective decryption modules 46.1, 46.2 of the different build tool plugins 40.1, 40.2 are added to the enhanced application code 132 of the enhanced application 130 as added decryption modules 146.1 and 146.2 during the build operation by the build tool 20. It is clear that, similar as described above, the added decryption modules 146.1 and 146.2 are respectively added to the enhanced application code 132 in such a way that, when the enhanced application code 132 accesses the encrypted sensitive application component 34.1 during execution of the enhanced application 130, the added decryption module 146.1 inserted in the enhanced application code 132 is called for decrypting the encrypted application component 134.1. It is also clear that, similar as described above, when the enhanced application code 132, during execution of the enhanced application 130, accesses the different encrypted application component 134.2, the different decryption module 146.2 inserted in the enhanced application code 132 is called for automatically decrypting the encrypted application component 134.2 of the enhanced application 130.

According to this embodiment, for example similar as described above the sensitive application component 34.1 for example comprises data, such as for example image data. The further sensitive application component 34.2 could for example alternatively comprise software code, such as for example further application code. This further application code of the sensitive application component 34.2 for example comprises a particular part of the overall application code of application 30, for which a higher level of security is desirable. By providing such further application code as such a sensitive application component 34.2 of the application 30, as shown, the build tool 20 will operate during the build operation to produce encrypted application component 134.2. Similar as explained above, both the encrypted component 34.1 and 34.2 will be added during the build operation to the enhanced application 130 as encrypted application components 134.1 and 134.2 which are encrypted by means of the respective encryption modules 42.1 and 42.2. The encrypted application component 134.2 comprising this further application code remains accessible to the enhanced application code 132 of the enhanced application 130 during execution by means of the corresponding added decryption module 146.2 which was inserted in the enhanced application code 132 during the build operation similar as described above.

According to a particular embodiment the sensitive application component 34.2 could for example comprise further application code, which is application code separate from the application code 32, for example provided in a separate file in the input software package of the application 30. Alternatively or additionally, the sensitive application component 34.2 could for example comprise further application code in a programming language different from the application code 32 of the application. According to such an embodiment the application code 32 of the application 30 could for example be provided in Java source code or bytecode, while the further application code of the sensitive application component 34 of the application could for example be provided in source code in another programming language such as for example C, C++, etc. or a type of byte code different from the bytecode of the application code 32. According to still a further embodiment, the sensitive application component 34.2 could comprise further application code comprising native code or machine code comprising a set of programming instructions that can be executed directly by a computer's central processing unit or CPU, for example for particular performance critical parts of the application.

It is clear that further alternative embodiments are possible and that the above mentioned embodiment is especially preferred when both the sensitive application components 34.1, 34.2 are both application components comprising data or a reference to data other than software code. It is clear that in general according to such embodiments the plurality of at least partly encrypted application components are generated from the plurality of corresponding application components by the encryption modules of the build tool plugins, such that at least one first at least partly encrypted application component is generated by the encryption module of a first build tool plugin; and at least one second at least partly encrypted application component is generated by the encryption module of a different, second build tool plugin. It is further clear that according to such embodiments the enhanced application code is generated by the build tool from the application code by respectively adding the corresponding decryption modules as corresponding added decryption modules, such that, during execution, when accessed by the enhanced application code: the corresponding at least one first at least partly encrypted application component is automatically decrypted by the corresponding first added decryption module of the first build tool plugin; and the corresponding at least one second at least partly encrypted application component is automatically decrypted by the corresponding second added decryption module of the second build tool plugin. It is further clear that, although the embodiment of FIG. 3 shows an embodiment comprising two application components and two corresponding at least partly encrypted application components, and two build tool plugins, there are alternative embodiments possible in which, instead of two, there are three, four, five or any other suitable plurality of build tool plugins and/or two or more at least partly encrypted application components. Although in general two or more plugins already provide for a distinctive advantage with respect to prior art systems, it is clear that preferably several plugins or many plugins are used in which the number is sufficiently high to allow for the desired level of diversity. It is thus clear that alternative embodiments are possible in which an arbitrary plurality of plugins or a freely selectable plurality of plugins are possible, however an increased number of plugins, such as for example three, four, five, six, etc. or more are preferable in order to allow for an increased level of diversity, without unduly compromising the complexity of the build operation and the subsequent decryption during execution of the application.

Figure 4:
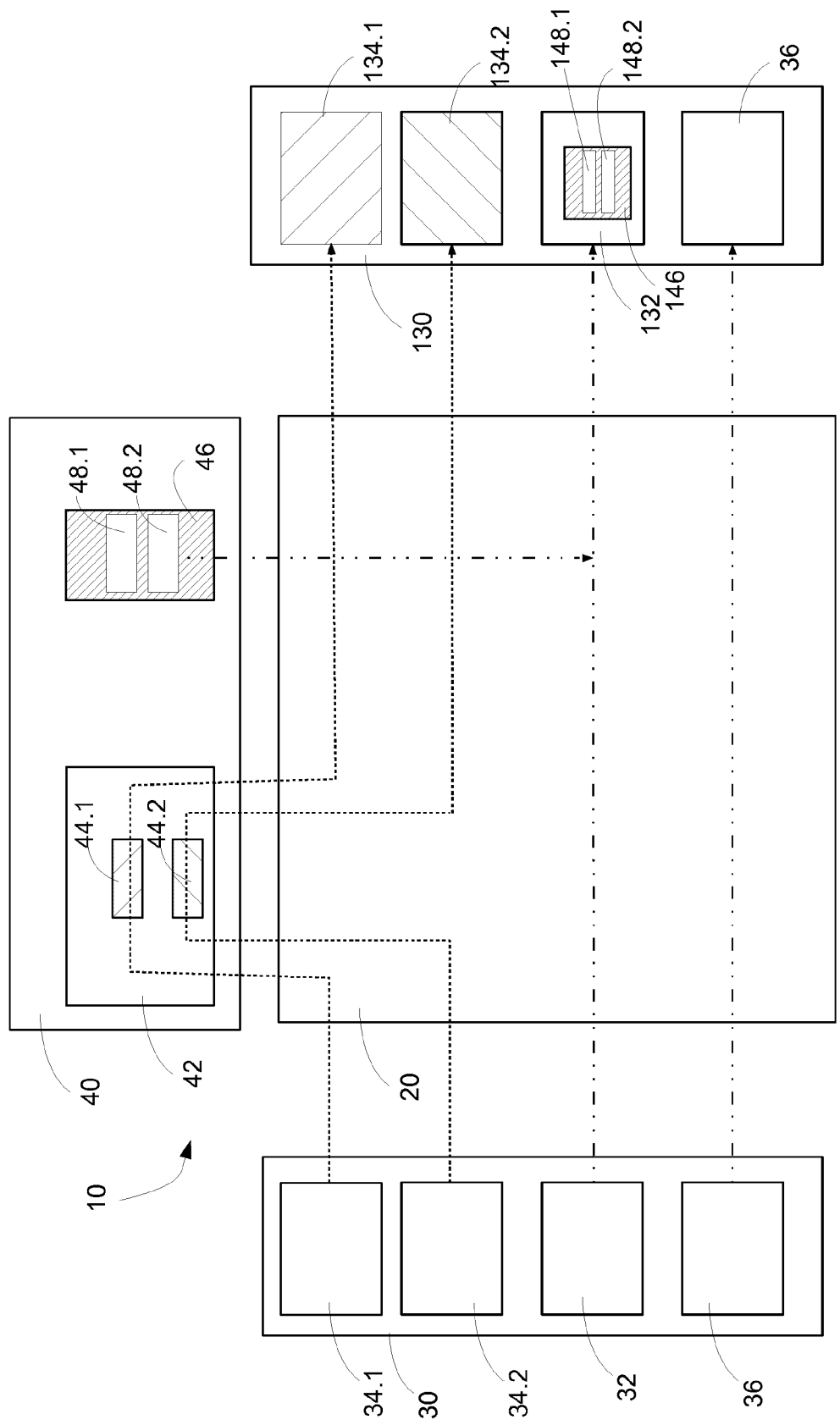

According to alternative embodiments, as for example shown in FIG. 4, instead of, or in combination with two or more build tool plugins 40, the encryption module 42 of a build tool plugin 40 could comprise two or more encryption algorithms 44.1, 44.2 and the decryption module 46 of this build tool plugin 40 could comprise two or more corresponding decryption algorithms 48.1, 48.2. Similar as described above, with reference to FIG. 3, the build tool 20, receives the application 30 comprising two sensitive application components 34.1 and 34.2, during the build operation. As shown, the build tool provides these sensitive application components 34.1 and 34.2 to the encryption module 42 of the build tool plugin 40 during the build operation. The encryption module 42 of the build tool plugin 40 will automatically encrypt these two different sensitive application components 34.1, 34.2 respectively by means of different encryption algorithms 44.1, 44.2. In general, this thus means that, at different times during the build operation, the build tool plugin, by means of its encryption module, is configured to encrypt application components by means of different encryption algorithms. The encryption module 42 of the build tool plugin 40 will automatically determine which of the encryption algorithms 44.1, 44.2 to use when provided with a sensitive application component 34.1, 34.2 during the build operation. Similar as described above, the build tool 20 also inserts the decryption module 46 of the build tool plugin 40, which comprises the respective different corresponding decryption algorithms 48.1, 48.2 in the enhanced application code 132 as an added decryption module 146 comprising corresponding added decryption algorithms 148.1 and 148.2 during the build operation. The build tool 20 thus adds the added decryption module 146 comprising different corresponding added decryption algorithms 148.1, 148.2 in the enhanced application code. During the build operation the build tool 20 does not need to be aware of whether the encryption module 42 and the decryption module 46 respectively comprise different encryption and decryption algorithms. It is the build tool plugin 40 and its encryption module 42, which during the build operation will automatically determine the encryption algorithm to be used. The build tool 20, during the build operation, inserts the added decryption module 146. The added decryption module 146 is added to the enhanced application code 132 in such a way that the added decryption module 146 automatically selects the corresponding added decryption algorithm 148.1, 148.2 when the enhanced application code 132 accesses the encrypted application components 134.1, 134.2 during execution of the enhanced application 130. This means that the added decryption module 146 in the enhanced application code 132 is configured in such way that, during execution of the enhanced application 130, the encrypted application component 134.1 can be accessed by the enhanced application code 132 by means of the added decryption algorithm 148.1 of the added decryption module 146 in the enhanced application code 132, and in such a way that the encrypted application component 134.2 can be accessed by the enhanced application code 132 by means of the added decryption algorithm 48.2 of the added decryption module 146 in the enhanced application code 132.

It is clear that still further alternative embodiments are possible, especially with respect to the number of encryption algorithms 44 and corresponding decryption algorithms 48 and the number of sensitive application components 34, as long as in general, when the build tool 20 receives an application 30 comprising two or more sensitive application components 34.1, 34.2, the build system 10 encrypts at least two different sensitive application components 34.1, 34.2 by means of different encryption algorithms 44.1, 44.2 at different times during the build operation. This combined with adding, during the build operation, different corresponding decryption algorithms 48.1, 48.2 in the enhanced application code 132 as different corresponding added decryption algorithms 148.1 and 148.2 of an added decryption module 146.

According to still further alternative embodiments different encryption and decryption algorithms and/or different build tool plugins can be used at different times during the build operation. As long as in general, the build system 10 encrypts two or more sensitive application components 34.1, 34.2 by means of different encryption modules 42.1, 42.2 and/or algorithms 44.1, 44.2; and adds the different corresponding decryption modules 46.1, 46.2 and/or decryption algorithms 48.1, 48.2 in the enhanced application code 132 as added decryption modules 146.1, 146.2 and/or added decryption algorithms 148.1, 148.2. As the different added decryption modules and/or added decryption algorithms are added to the enhanced application code 132 during the build operation by the build tool 20 in such a way that, when the enhanced application code 132 of the enhanced application 130 during execution needs to access the encrypted sensitive application items 134, the corresponding added decryption module 146 and/or corresponding added decryption algorithm 148 is called, there is no need to keep track of which particular encryption module and/or encryption algorithm was used for which particular sensitive application component 34 during the build operation. According to a preferred embodiment the build system 10 randomly encrypts the sensitive application components 34.1, 34.2 during the build operation by means of the different encryption modules 42.1, 42.2 and/or different algorithms 44.1, 44.2, as this minimizes the risk for detectable patterns in the enhanced application code 132 of the enhanced application, which could provide a pointer for an attacker to gain access to the encrypted application components 134 of the enhanced application 130. However it is clear that still further embodiments are possible in which for example the build system 10 during the build operation encrypts the application components 34 of the application by means of different encryption modules 42.1, 42.2 of different build tool plugins 40.1, 40.2 and/or different encryption algorithms 44.1, 44.2 in function of the data size or the data type of the application component 34. This for example enables the use of particular encryption modules and/or encryption algorithms that are optimized for handling a particular data size or data type. For example for application components 34 with a data size smaller than a predetermined threshold the encryption module and corresponding decryption module could be chosen with a more complex security algorithm than for application components with a data size larger than the threshold. This for example ensures a high level of security for relatively small text strings comprising less than 10 kB of data, while ensuring computational efficiency when encrypting and decryption for example larger image or video files comprising several MB or GB of data. This for example also allows to make use of encryption and corresponding decryption modules which are optimized for use with a particular data type, such as for example an image encryption module and decryption module optimized to process image data, an audio encryption and decryption module optimized to process audio data, etc. It is clear that still further alternative embodiments are possible, for example in which different encryption modules 42.1, 42.2 of different build tool plugins 40.1, 40.2 are applied in a sequential way, one after the other, during the build operation. For example, the selection of the first build tool plugin could subsequently be followed by the selection of the second build tool plugin. According to still further embodiments, the application of different build tool plugins 40.1, 40.2 at different times during the build operation could preferably lead to the respective decryption modules being added at different locations in the enhanced application. According to still further embodiments the selection of different build tool plugins 40.1, 40.2 could be performed iteratively, such that during a plurality of iterations selections of different build tools are performed in a repetitive fashion.

Figure 5:
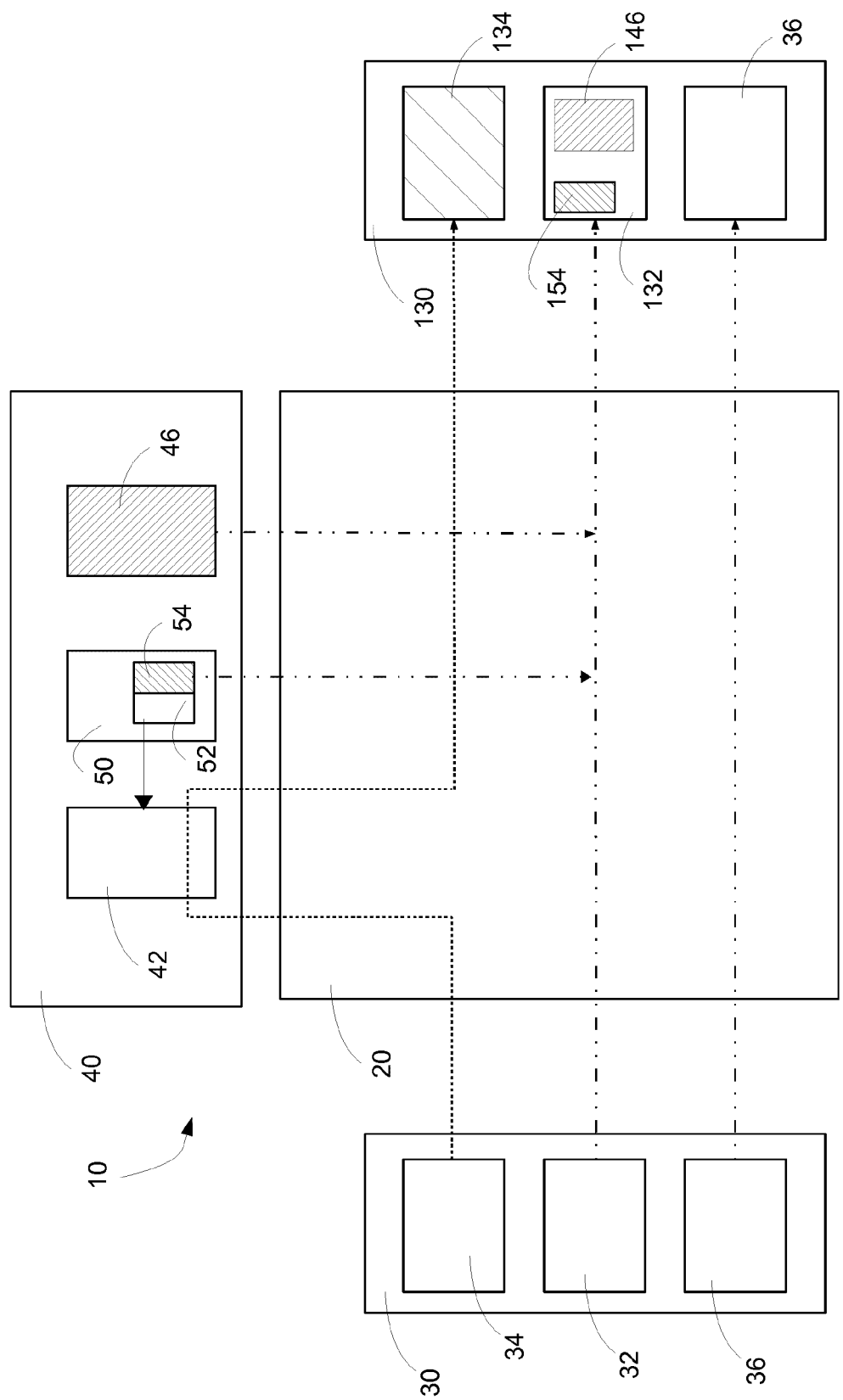

Still a further embodiment of the build system 10 is schematically shown in FIG. 5. This embodiment is similar to that of FIG. 1 and similar elements are provided with similar references and generally function in a similar way. According to this embodiment the build tool plugin 40 further also comprises a security key generator 50. As shown, this security key generator 50 according to this embodiment generates a security key pair 52, 54. The security key generator 50 of the build tool plugin 50, during the build operation, generates encryption keys 52 for use by the encryption module 42. Additionally during the build operation the key generator also generates corresponding decryption keys 54. As shown, during the build operation the build tool 20 makes use of the encryption module 42 which makes use of the encryption key 52 generated by the key generator 50 to encrypt the sensitive application component 34 of the application. Similar as explained above this encrypted application component 34 is added to the enhanced application 130 by the build tool during the build operation. Additionally, during the build operation the build tool 20, next to inserting the added decryption module 46 to the enhanced application code 132, the build tool 20 also adds the decryption key 54 provided by the key generator 50 to the enhanced application code 132 as an added decryption key 154. During the build operation the build tool adds the decryption key 54 to the enhanced application 130 in such a way that it can be used by the added decryption module 146 during execution of the enhanced application 130. According to the embodiment shown, the added decryption key 154 is inserted into the enhanced application code 132 of the enhanced application 130. During the build operation, the build tool 20 adds the added decryption keys 154 to the enhanced application 130 in such a way that when the added decryption keys 154 are accessed by the enhanced application code 132 during execution of the enhanced application, the corresponding at least partly encrypted application component 134 is automatically decrypted by the corresponding added decryption module 146 making use of the corresponding added decryption keys 154.

Figure 6:
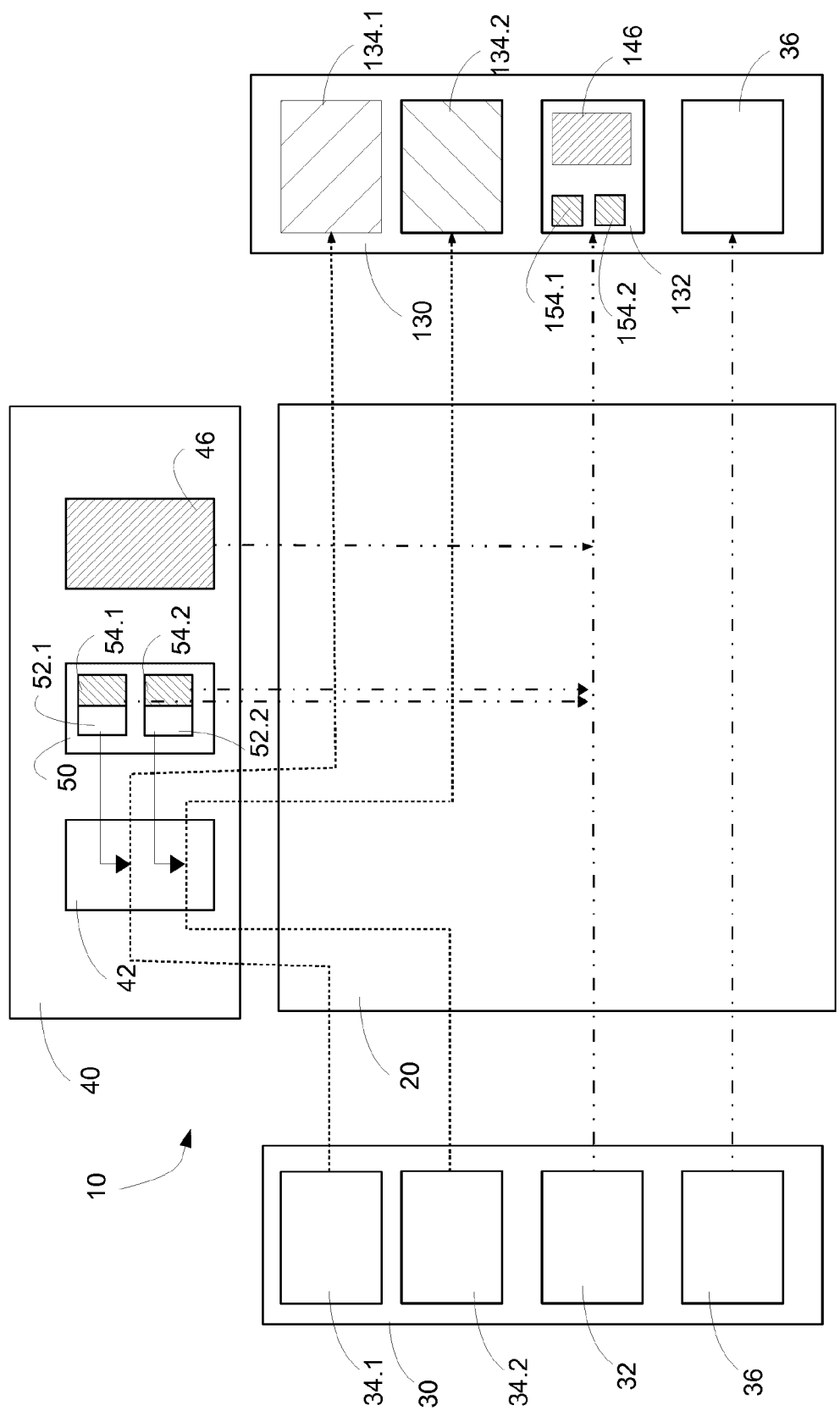

According to a further embodiment shown in FIG. 6, similar to that of FIG. 5, during the build operation, the key generator 50 of the build tool plugin 40 preferably automatically generates different security key pairs 52.1, 54.1 and 52.2, 54.2. For example, according to this embodiment for each of the sensitive application components 34.1, 34.2 a different encryption and corresponding decryption key are generated. As shown during the build operation the build tool adds the different decryption keys 54.1, 54.2 to the enhanced application 130 as added decryption keys 154.1 and 154.2. According to the embodiment shown, the added decryption keys are inserted in the enhanced application code 132, however according to alternative embodiments the added decryption keys could be added to any suitable component of the enhanced application, such as for example the non-encrypted application component 36. Similar as explained above, the build tool 20 during the build operation inserts the different decryption keys 154.1, 154.2 in the enhanced application in such a way that during execution of the enhanced application 130, when the enhanced application code 132 requires access to a respective encrypted application component 134.1 or 134.2, this encrypted application component will be automatically decrypted by means of added decryption module 146 and the respective corresponding added decryption key 154.1 or 154.2. It is clear that, alternative to making use of different keys for each application component 34, still further alternative embodiments are possible in which the use of different added decryption keys in the enhanced application increases the difficulty for identifying detectable patterns for a hacker. According to such alternative embodiments at different times during the build operation, the key generator 50 automatically generates different encryption and corresponding decryption keys randomly, in function of the data size of the application component 34, in function of the data type of the application component 34, in function of each predetermined group of application components 34, etc. As the type of security keys is typically closely linked to the particular encryption module and decryption module, it is also advantageous when there are provided different key generators 50 and/or the key generator 50 generates different encryption and decryption keys during the build operation for each encryption module 42 and corresponding decryption module 46 of different build tool plugins of the build system 10. Preferably when the system comprises a plurality of build tool plugins, each build tool plugin comprises a key generator for cooperation with its encryption module during the build operation and for providing decryption keys to the build tool during the build operation for insertion into the enhanced application together with the decryption module.

Figure 7:
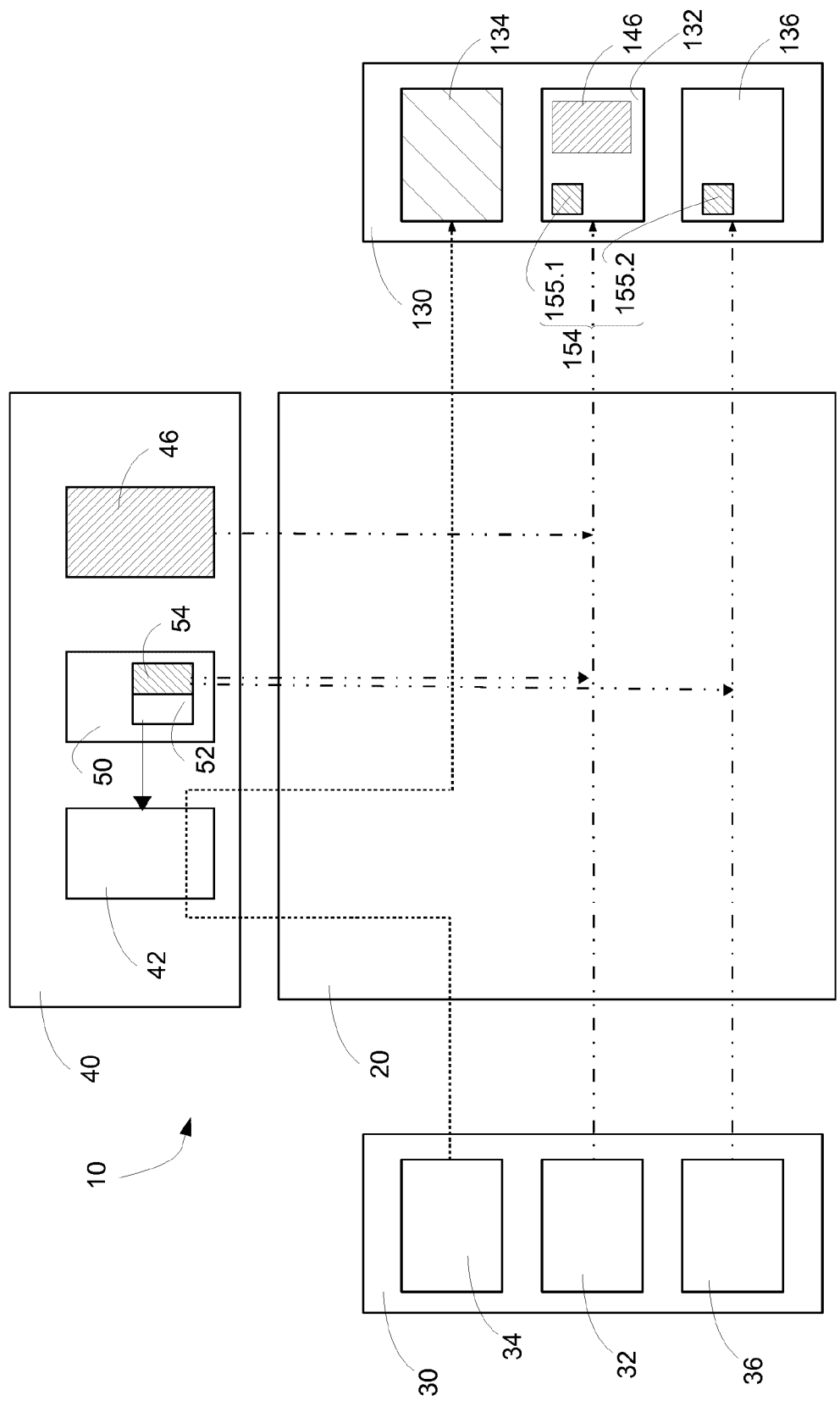

According to a particular advantageous embodiment, as shown in FIG. 7, and similar to the embodiment of FIG. 5, the build tool 20 adds the decryption key 54 to the enhanced application 130 as two separate added decryption key parts 155.1 and 155.2. As shown, according to this embodiment the added decryption key 154 is formed by an added decryption key part 155.1 in the enhanced application code, while a further added decryption key part 155.2 is inserted in the added non-encrypted application component 136 of the enhanced application. It is clear that the build tool, during the build operation adds the decryption key parts 155.1, 155.2 in such a way to the enhanced application, that during execution of the enhanced application the added decryption module 146 and the added decryption key parts 155.1, 155.2 allow automatic decryption of the encrypted application component 134 when accessed by the enhanced application code 132. It is clear that according to a further embodiments the added decryption keys 154 in the enhanced application code 132 can for example be obfuscated by adding, during the build operation, the decryption key 54 to the enhanced application 130 in such a way that the added decryption key 154 is at least partly interwoven with another added decryption key 154. According to still further alternative embodiments obfuscation can be obtained by adding, during the build operation, the decryption key 54 to the enhanced application 130 in such a way that the added decryption key 154 is at least partly interwoven with an added at least partly secured application component 134. It is clear that according to still further embodiments alternative or additional obfuscation steps could be applied such as for example renaming of methods and variables, hashing and mixing software code in such a way that it remains operative but leads to an increasing difficulty for enabling efficient disassembly, etc.

Figure 8:
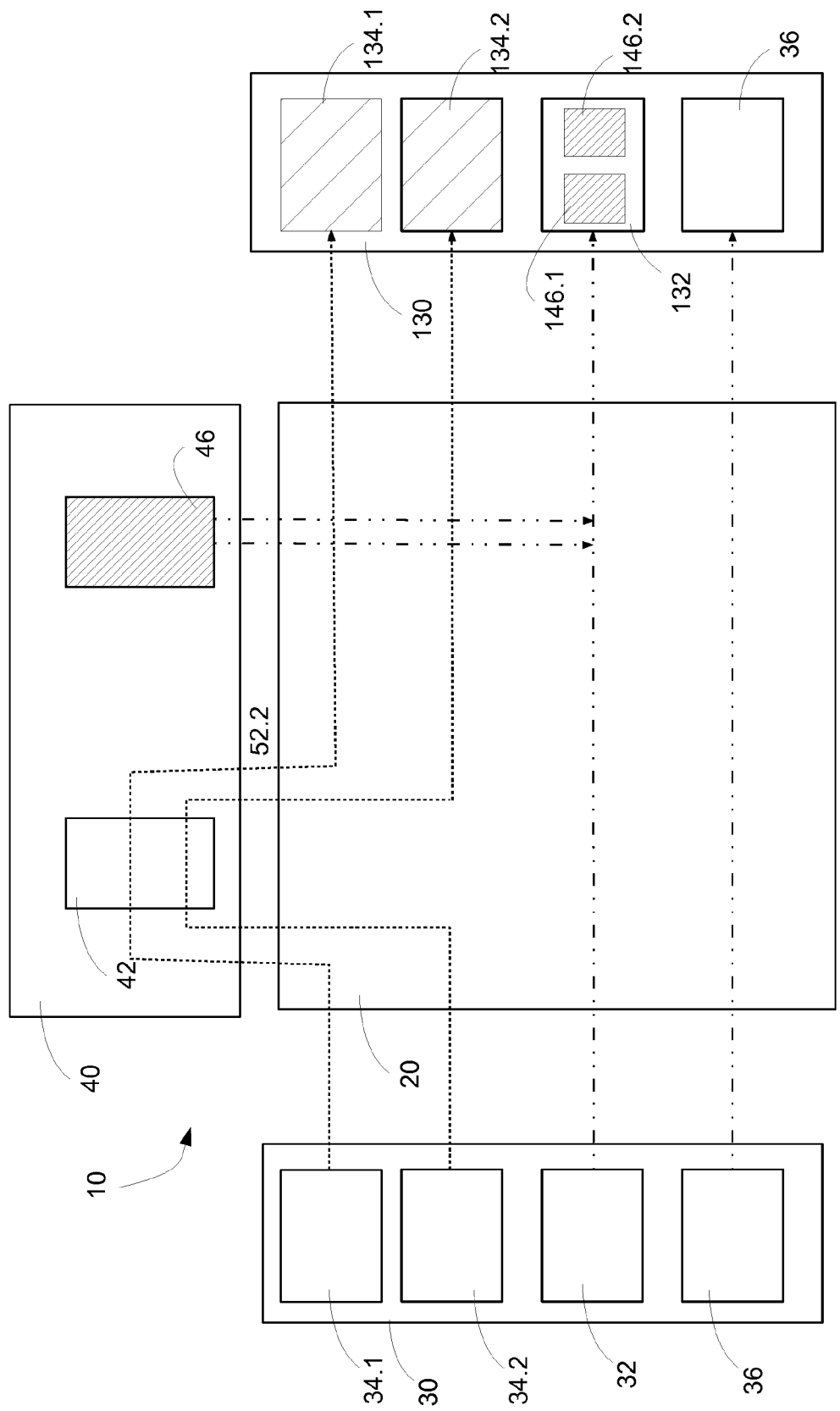

FIG. 8 shows still a further embodiment similar to the embodiment of FIG. 1. According to this embodiment the build tool 20 generates for the decryption module 46 of a build tool plugin 40 different variations of the added decryption module 146 at different times during the build operation. For example, while as shown, according to this embodiment both sensitive application components 34.1 and 34.2 are encrypted by means of the same encryption module 42. The build tool will add the corresponding decryption module 46 as two different variations of the added decryption module 146.1 and 146.2, for example both by means of a different method of obfuscation.

In general there are various ways possible in which the build tool could generate the added decryption module 146. For example the build tool could generate the added decryption module 146 as a copy of the decryption module 46, a converted version of the decryption module 46, a compiled version of the decryption module 46, an obfuscated version of the decryption module 46, a transformed but functionally equivalent version of the decryption module 46, etc. and/or any suitable combination thereof.

According to the embodiments of FIGS. 1 to 8, the application 30 is schematically represented as an application 30 comprising at least one sensitive application component 34 in addition to the application code 32. However it is clear that, as shown in FIG. 9, further alternative embodiments are possible in which the application 30 comprises application code which comprises at least one of the sensitive application components 34. The sensitive application component 34 in such embodiments could for example be a sensitive part of the application code 32. According to some embodiments the sensitive application component 34 could for example comprise an identifier, a name, a numerical identifier, an application resource identifier, an application asset identifier, etc. which is present in the application code 32 and which is considered a sensitive reference or a reference to sensitive data. It is clear that still further alternative embodiments of an application 30 are possible which comprises at least one sensitive application component 34 comprised in the application code 32 and at least one sensitive application component 34 in addition to the application code 32.

It is further also clear that the build system 10 according to varying embodiments is able to generate different embodiments of the enhanced application 130, such as for example an enhanced application in which: the enhanced application code 132 comprises at least one of the at least partly encrypted application components 134 such as shown in FIG. 9; the enhanced application 130 comprises at least one at least partly encrypted application component 134 in addition to the enhanced application code 132, such as shown in FIGS. 1 to 8. However still further alternative embodiments are possible such as for example embodiments in which the enhanced application 130 comprises at least one at least partly encrypted application component 134 which is partly comprised within the enhanced application code 132 and partly added to the enhanced application 130 in addition to the enhanced application code 132. According to still further embodiments the enhanced application 130 could for example comprise at least two at least partly encrypted application components 134 which are interwoven. According to a particular embodiment this could for example mean that at least a part of a first encrypted application component is woven into a second encrypted application component. According to still further embodiments, this could for example mean that the encrypted application components are for example woven into the code and/or data of the application and/or the enhanced application.

According to the embodiments shown above the application code 32 is schematically shown as a single component of the application 30, it is clear that alternative embodiments are possible in which the application code 32 is for example provided as a plurality of different components, for example two class files comprising Java bytecode or two dex files comprising Dalvik bytecode. It should be clear that, the same also holds for the enhanced application code 132 of the enhanced application 130 of the embodiments shown. According to alternative embodiments the build tool 20 could also provide the enhanced application code 132 as a plurality of different components of the enhanced application. It is clear that still further alternative embodiments are possible, as long as in general the build tool 20 receives an application 30 comprising at least one sensitive application component 34 and application code 32 during a build operation.

Although according to the embodiments described above the encrypted sensitive application components 34 are schematically shown to be encrypted in their entirety, it is clear that alternative embodiments are possible, as long as in general the encrypted sensitive application components are encrypted at least partly.

It is further also clear that, in general, the enhanced application 130 does not comprise the encryption module 42, and/or a reference to the encryption module 42. Still the enhanced application 130 during execution is able to decrypt automatically the encrypted application components by means of the added decryption modules 146.

Figure 10:
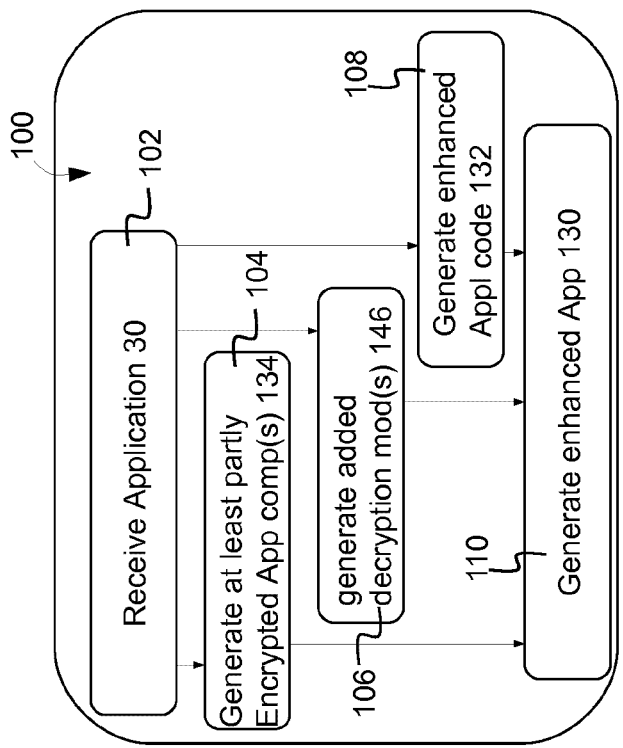
FIG. 10 schematically shows an embodiment of a computer implemented method for operating a build system according to FIG. 1 during a build operation.

FIG. 10 shows an embodiment of a computer-implemented method 100 for operating the build system 10 during a build operation as generally described above. The computer implemented method is thus generally performed during a build operation 100. As shown at step 102 the build tool 20 receives the application 30 comprising the application code and at least one sensitive application component. At step 104 the build tool 20 and the encryption module 42 generate the at least one at least partly encrypted application component 134 from the at least one sensitive application component 34. At step 106 the build tool 20 generates the corresponding added decryption modules 146 for insertion in the enhanced application code 132 generated at step 108. As shown, at step 110, thereby the build tool 20 generates the enhanced application 130.

Figure 11:
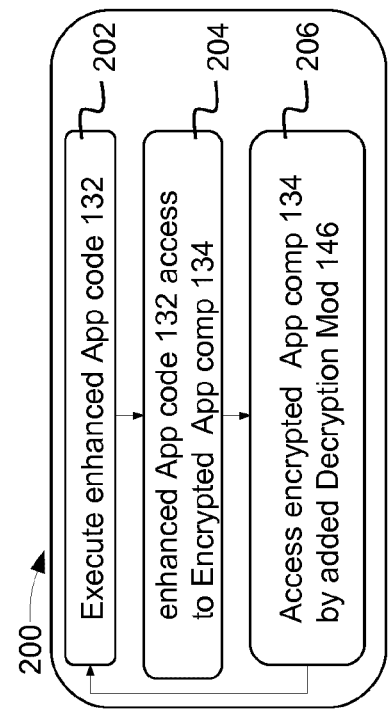
FIG. 11 schematically shows an embodiment of a method of executing an enhanced application generated with the build operation of FIG. 10.

During a subsequent execution 200 of the enhanced application 130, as shown in FIG. 11, for example during use by an end user on a suitable computing device, the following steps will be performed. At step 202 the enhanced application code 132 will be executed, until at step 204 the enhanced application code 132 requests access to an encrypted application component 134. Then, at step 206, access to this encrypted application component 134 is provided by the corresponding added decryption module 146 in the enhanced application code 132 which automatically decrypts the at least partly encrypted application component 134. As shown, execution of the enhanced application code 132 can then continue at step 202. It is clear that still further embodiments of the method for operating the build system 10 are possible, for example in line with the different embodiments of the build system 10 described above and variations or combinations thereof.

It is clear that according to particularly preferred embodiment, the method of operating the build system as described with reference to FIG. 10 is performed iteratively during a plurality of iterations. This for example means that the application received 30 by the build system 10 for performing a subsequent iteration of this method at least partly comprises the enhanced application 130 generated by the build system 10 during a previous iteration of the method. This can for example be realised by providing the enhanced application 130 generated as an output software packaging by the build tool 20, subsequently during at least one further iteration again as an input software package comprising an application 30 to the same or another build tool 20 during the build operation. In this way multiple independent layers of security can be realised during the build operation. According to such an embodiment for example the method could, during the build operation, during a first iteration generate an enhanced application 130 comprising an added decryption module 146 and an added decryption key 154, such as for example shown in the embodiment of FIG. 5. During a subsequent iteration the method could then continue by providing the enhanced application 130 generated by the build tool 20 according to the embodiment of FIG. 5 as an application 30 for the build tool according to the embodiment of FIG. 9. During this subsequent iteration, for the build tool 20 of the embodiment of FIG. 9, will then for example select the added decryption module 146 or the added decryption key 154 of the enhanced application 130 generated during the previous iteration as a sensitive application component 34 of the application 30 for this subsequent iteration. It is clear that, then during this subsequent iteration, the build tool 20 of the embodiment of FIG. 9, could for example generate at least partly encrypted application components 134 from these selected application components 34. According to this embodiment, in this way by chaining or iterating both embodiments of the build tool, in the end there is provided an enhanced application 130 in which for example the added decryption key of a first iteration was further encrypted during a second iteration. By treating decryption modules and/or decryption keys added to an enhanced application as sensitive application components 34 during a subsequent iteration, a multi-layered level of security is thus realised during the build operation. It is clear that this can be realised without raising complexity of the build operation. It is also clear that, even when such a multi-layered encryption approach is applied, decryption can be performed during execution of the enhanced application after subsequent distribution automatically and efficiently by the enhanced application itself without requiring any external resources.

Figure 12:
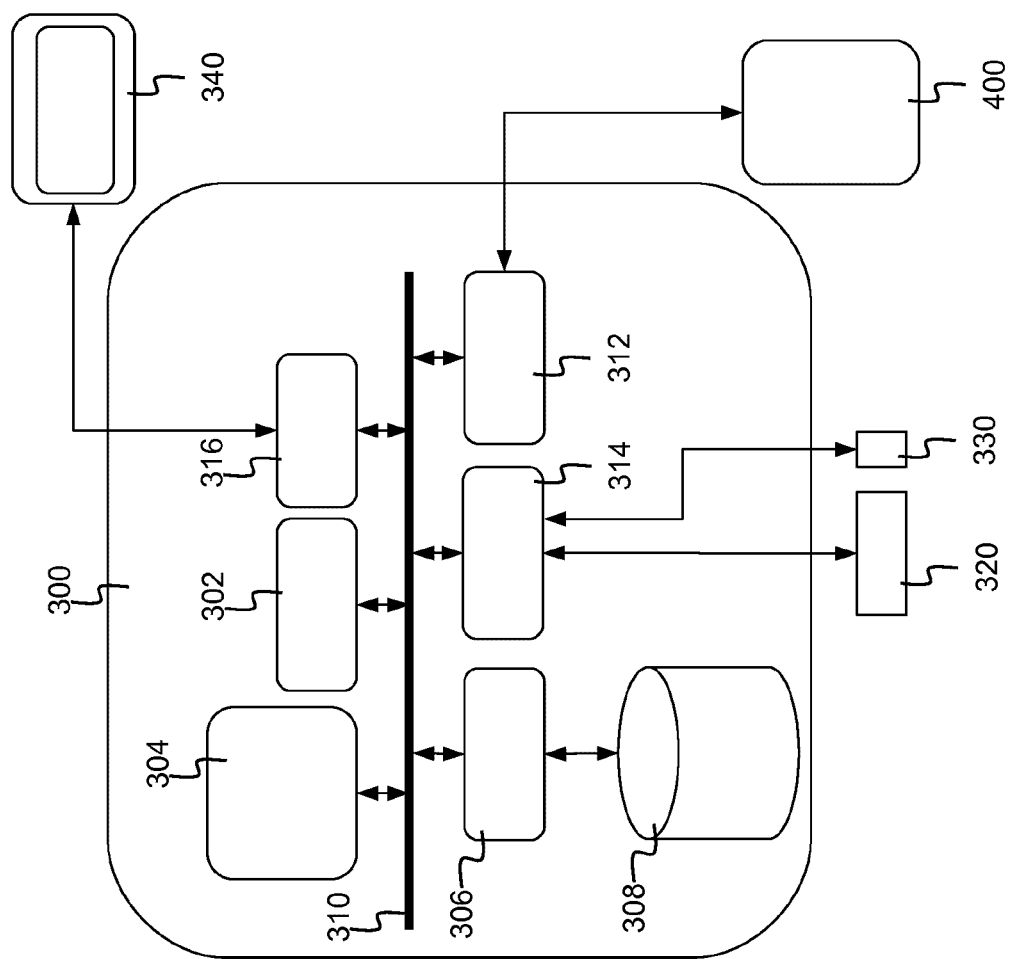
FIG. 12 schematically shows an embodiment of a computing system for executing the computer implemented method of FIG. 10.

FIG. 12 shows a suitable computing system 300, 400 for hosting the build system 10 or any of its components such as the build tool 20, the build tool plugin 40, etc. as described with reference to the abovementioned embodiments. Computing system 300 may in general be formed as a suitable general purpose computer and comprise a bus 310, a processor 302, a local memory 304, one or more optional input interfaces 314, one or more optional output interfaces 316, a communication interface 312, a storage element interface 306 and one or more storage elements 308. Bus 310 may comprise one or more conductors that permit communication among the components of the computing system. Processor 302 may include any type of conventional processor or microprocessor that interprets and executes programming instructions. Local memory 304 may include a random access memory (RAM) or another type of dynamic storage device that stores information and instructions for execution by processor 302 and/or a read only memory (ROM) or another type of static storage device that stores static information and instructions for use by processor 302. Input interface 314 may comprise one or more conventional mechanisms that permit an operator to input information to the computing device 300, such as a keyboard 320, a mouse 330, a pen, voice recognition and/or biometric mechanisms, etc. Output interface 316 may comprise one or more conventional mechanisms that output information to the operator, such as a display 340, a printer, a speaker, etc. Communication interface 312 may comprise one or more transceiver-like mechanisms such as for example two 1 Gb Ethernet interfaces that enables computing system 300 to communicate with other devices and/or systems, for example mechanisms for communicating with one or more other computing systems 400. The communication interface 312 of computing system 300 may be connected to such another computing system 400 by means of a local area network (LAN) or a wide area network (WAN), such as for example the internet. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example 1 TB SATA disk drives, and control the reading and writing of data to and/or from these storage elements 308. Although the storage elements 308 above is described as a local disk, in general any other suitable computer-readable media such as a removable magnetic disk, optical storage media such as a CD or DVD, -ROM disk, solid state drives, flash memory cards, . . . could be used.

The build system 10 according to the above mentioned embodiments could be implemented by means of a suitable build automation utility running a computing system 300 locally available to a developer, such as a personal computer, laptop, etc. or on a remotely accessible computing system such as one or more servers available to a plurality of application developers. Alternatively the build system 10 may also comprise build automation servers, for example comprising web based build tools, which execute build automation utilities on a scheduled or triggered basis, such as for example a continuous integration server. It is clear that the components like the build tool 20, the build tool plugin 40, the encryption module 42, the decryption module 46, etc. and their associated computer implemented method of operation, can be implemented as programming instructions stored in the local memory 304 of the computing system 300 for execution by its processor 302. Alternatively these components could be stored on the storage element 308 or be accessible from another computing system 400 through the communication interface 312. In general, in this way the build system 10 and the associated computer implemented method are provided as a computer program comprising software code adapted to perform this computer-implemented method when executed by a computing system. Alternatively the build system 10 and the associated computer implemented method could also be provided as a computer readable storage medium comprising computer-executable instructions which, when executed by a computing system, perform the computer-implemented method.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein. This is especially the case for the embodiments described above which refer to a single build tool plugin and/or a single application component. It is clear that these embodiments are disclosed in a manner sufficiently clear and complete for a skilled person to apply that teaching to embodiments making use of two or more build tool plugins for processing a plurality of application components.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A build system for generating an enhanced application comprising at least one encrypted application component during a build operation, said build system comprising:
    a build tool configured to receive an application comprising application code and a plurality of application components; and
    two or more build tool plugins coupled to said build tool during a build operation, the two or more build tool plugins each comprising an encryption module and a corresponding decryption module,
    the build tool, during the build operation, configured to generate an enhanced application making use of the two or more build tool plugins, such that the enhanced application comprises enhanced application code and a plurality of at least partly encrypted application components, and:
    the plurality of at least partly encrypted application components generated from the plurality of corresponding application components by the encryption modules of the build tool plugins, such that:
    at least one first at least partly encrypted application component is generated by the encryption module of a first build tool plugin;
    at least one second at least partly encrypted application component is generated by the encryption module of a different, second build tool plugin, and
    the enhanced application code generated by the build tool from the application code by respectively adding the corresponding decryption modules as corresponding added decryption modules, such that, during execution, when accessed by the enhanced application code:
    the corresponding at least one first at least partly encrypted application component is automatically decrypted by the corresponding first added decryption module of the first build tool plugin; and the corresponding at least one second at least partly encrypted application component is automatically decrypted by the corresponding second added decryption module of the second build tool plugin.

2. The build system according to claim 1, wherein the build tool is configured to make use of said different build tool plugins at different times during the build operation.

3. The build system according to claim 1, wherein the build system is further configured to encrypt the application components by means of said different build tool plugins selected at different times during the build operation according to one or more of the following:
   randomly;
   in function of the data size of the application component;
   in function of the data type of the application component;
   in function of one or more properties of the application component,
   and preferably in that the selected different build tool plugins are combined:
   sequentially;
   such that a selection of the first build tool plugin is subsequently followed by a selection of the second build tool plugin;
   iteratively;
   in different locations or overlapping locations.

4. The build system according to claim 1, wherein the build system is further configured to receive an application comprising two or more application components in addition to the application code, and in that
   the encryption module of the first and/or second build tool plugins are further configured to generate an enhanced application in which two or more of the at least partly encrypted first and/or second application components are interwoven.

5. The build system according to claim 1, wherein the application components respectively comprise one or more of the following:
   data;
   a reference to data;
   which, during execution are accessed by the enhanced application code.

6. The build system according to claim 1, wherein the application components respectively comprise one or more of the following:
   data representative of or comprising one or more of the following:
   text data, string data, image data, audio data, video data, animation data, layout data, style data, color data, menu data, configuration data, metadata, tokens;
   an application resource;
   an application asset;
   a reference to data comprising one or more of the following:
   an identifier;
   a name;
   a numerical identifier;
   an application resource identifier;
   an application asset identifier.

7. The build system according to claim 1, wherein the build tool is configured to:
   receive the application as an input software package comprising the application code and the plurality of application components; and
   to generate the enhanced application as an output software package comprising the enhanced application code and the plurality of at least partly encrypted application components.

8. The build system according to claim 1, wherein the enhanced application does not comprise the encryption modules of the two or more build tool plugins, and/or a reference to the encryption modules of the two or more build tool plugins.

9. The build system according to claim 1, wherein the build tool is configured to generate the added decryption modules of the two or more build tool plugins respectively as one or more of the following:
   a copy of the decryption module;
   a converted version of the decryption module;
   a compiled version of the decryption module;
   an obfuscated version of the decryption module;
   a transformed but functionally equivalent version of the decryption module.

10. The build system according to claim 1, wherein the build tool is further configured to add, during the build operation, the decryption module of at least one of the build tool plugins to the enhanced application as an added decryption module comprising two or more separate decryption module parts at different locations in the enhanced application code.

11. The build system according to claim 1, wherein the build tool is configured to generate for the decryption module of at least one of the build tool plugins different variations of the corresponding added decryption module at different times during the build operation.

12. The build system according to claim 1, wherein:
   the encryption module at least one of the build tool plugins comprises two or more encryption algorithms and the corresponding decryption module of this build tool plugin comprises two or more corresponding decryption algorithms, and in that
   the build system is further configured to:
   encrypt application components by means of different encryption algorithms of the encryption modules of this build tool plugin at different times during the build operation; and
   add different corresponding added decryption algorithms in the enhanced application code generated from the different corresponding decryption algorithms; and
   preferably wherein the build system is further configured to encrypt the application components by means of said different encryption algorithms selected at different times during the build operation according to one or more of the following:
   randomly;
   in function of the data size of the application component;
   in function of the data type of the application component;
   in function of one or more properties of the application component,
   and preferably in that the selected different encryption algorithms are combined:
   sequentially;
   such that a selection of a first encryption algorithm is subsequently followed by a selection of a second encryption algorithm;
   iteratively;
   in different locations or overlapping locations.

13. The build system according to claim 1, wherein at least one of the build tool plugins further comprises a security key generator configured to generate encryption keys for use by the encryption module of this build tool plugin during the build operation and corresponding decryption keys for use by the added decryption module of this build tool plugin during execution, and wherein the build tool, during the build operation, is further configured to generate the enhanced application by adding the decryption keys of this build tool plugin as added decryption keys, such that during execution, when accessed by the enhanced application code, the corresponding at least partly encrypted application component is automatically decrypted by the corresponding added decryption module of this build tool plugin making use of the corresponding added decryption keys.

14. The build system according to claim 13, wherein the key generator of this build tool plugin is further configured, during the build operation, to automatically generate different encryption and corresponding decryption keys:
   randomly;
   in function of the data size of the application component;
   in function of the data type of the application component;
   in function of one or more properties of the application component;
   for each application component;
   for each predetermined group of application components; and/or
   for each encryption module and corresponding decryption module,
   and preferably in that the generated different encryption and corresponding decryption keys are combined:
   sequentially;
   such that a generation of a first encryption and corresponding decryption key is subsequently followed by a selection of a second encryption and corresponding decryption key;
   iteratively;
   in different locations or overlapping locations,
   the build tool configured to generate the enhanced application such that, during execution, the different added decryption keys are accessed by the corresponding added decryption module of this build tool plugin when automatically decrypting the corresponding at least partly encrypted application component.

15. The build system according to claim 13, wherein this build tool plugin of the build tool is further configured to add, during the build operation, the decryption key to the enhanced application:
   as an added decryption key comprising two or more separate decryption key parts at different locations in the enhanced application; and/or
   as an added decryption key which is at least partly interwoven with another added decryption key and/or an added at least partly secured application component.

16. A build system according to claim 1, for operating a computer implemented method, the method comprising the steps of:
   the build tool receiving the application comprising application code and the plurality of application component;
   the build tool, during the build operation, generating, by making use of the encryption modules of the two or more build tool plugins, an enhanced application comprising the enhanced application code and a plurality of at least partly encrypted application components:
   the encryption modules of the build tool plugins generating the plurality of at least partly encrypted application components from the plurality of corresponding application components, by:
   generating at least one first at least partly encrypted application component by the encryption module of a first build tool plugin;
   generating at least one second at least partly encrypted application component by the encryption module of a different, second build tool plugin, and the build tool generating the enhanced application code from the application code by respectively adding the corresponding decryption modules as corresponding added decryption modules, by, during execution, when accessed by the enhanced application code:
   automatically decrypting the corresponding at least one first at least partly encrypted application component by the corresponding first added decryption module of the first build tool plugin; and
   automatically decrypting the corresponding at least one second at least partly encrypted application component by the corresponding second added decryption module of the second build tool plugin.

17. The build system according to claim 16, wherein the method comprises the steps of performing the method of operating the build system iteratively, such that the application received by the build system for performing a subsequent iteration of the method of operating the build system at least partly comprises the enhanced application generated by the build system during a previous iteration of the method of operating the build system.

18. The build system according to claim 17, wherein the method comprises the steps of:
   selecting the plurality of application components for the subsequent iteration of the method of operating the build system in such a way that at least a share of these application components comprises an added decryption module and/or an added decryption key of the enhanced application generated during the previous iteration of the method of operating the build system; and
   generating the plurality of at least partly encrypted application components from these selected plurality of application components during the subsequent iteration of the method of operating the build system.

* * * * *